United States Patent [19]

Ikenoue

[11] Patent Number: 4,568,171
[45] Date of Patent: Feb. 4, 1986

[54] SYSTEM FOR CONTROLLING THE RECIPROCATION OF A SCANNING ARRANGEMENT

[75] Inventor: Yoshikazu Ikenoue, Toyokawa, Japan

[73] Assignee: Minolta Camera Kabushiki Kaisha, Osaka, Japan

[21] Appl. No.: 511,390

[22] Filed: Jul. 5, 1983

[30] Foreign Application Priority Data

Jul. 5, 1982 [JP] Japan ................................ 57-117313
Jul. 14, 1982 [JP] Japan ................................ 57-122365
Jul. 26, 1982 [JP] Japan ................................ 57-130964

[51] Int. Cl.[4] .......................................... G03G 15/00
[52] U.S. Cl. ................................. 355/8; 355/14 R; 355/14 C; 355/3 R; 318/696; 318/626
[58] Field of Search ............ 355/8, 14 R, 14 C, 3 R; 318/293, 561, 696, 681

[56] References Cited

U.S. PATENT DOCUMENTS

| 3,409,814 | 11/1968 | Azuma et al. | 318/341 |
| 3,471,103 | 10/1969 | Gabor | 318/293 |
| 3,733,124 | 5/1973 | Tanaka et al. | 355/10 |
| 3,824,440 | 7/1974 | McIntosh | 318/696 |
| 4,057,341 | 11/1977 | Sohm | 355/14 R X |
| 4,099,214 | 7/1978 | Jones | 355/14 R X |
| 4,280,763 | 7/1981 | Arai et al. | 355/14 C X |
| 4,287,461 | 9/1981 | Promis et al. | 318/571 |
| 4,319,170 | 3/1982 | Brent | 318/376 |
| 4,319,171 | 3/1982 | Motoori | 318/293 X |
| 4,330,196 | 5/1982 | Yamaguchi | 355/8 |
| 4,332,461 | 6/1982 | Cail et al. | 355/55 X |
| 4,371,254 | 2/1983 | Beery | 355/8 |
| 4,383,753 | 5/1983 | Inuzuka et al. | 355/8 |
| 4,464,044 | 8/1984 | Matsuyama | 355/14 R |

FOREIGN PATENT DOCUMENTS

| 45-14460 | 5/1970 | Japan . |
| 54-141134 | 11/1979 | Japan . |
| 55-113072 | 9/1980 | Japan . |
| 56-88144 | 7/1981 | Japan . |
| 56-83770 | 9/1981 | Japan . |
| 57-90666 | 6/1982 | Japan . |

Primary Examiner—William M. Shoop, Jr.
Assistant Examiner—Shik Luen Paul Ip
Attorney, Agent, or Firm—Price, Gess & Ubell

[57] ABSTRACT

A system for controlling the reciprocation of a scanning apparatus includes scanning device for scanning an original from a home position across the original to a scanned position and returning it from the scanned position back to the home position, a D.C. motor for driving the scanning device, and a switching circuit for providing electric power to the D.C. motor. A control device is coupled to the switching circuit for controlling the speed of the scanning device such that: the scanning device scans across the original at a predetermined constant speed; when it reaches the scanned position, the scanning device starts to return back towards the home position by application of a constant supply of power having a predetermined level; and thereafter it is gently returned back to the home position with less deviation.

29 Claims, 25 Drawing Figures

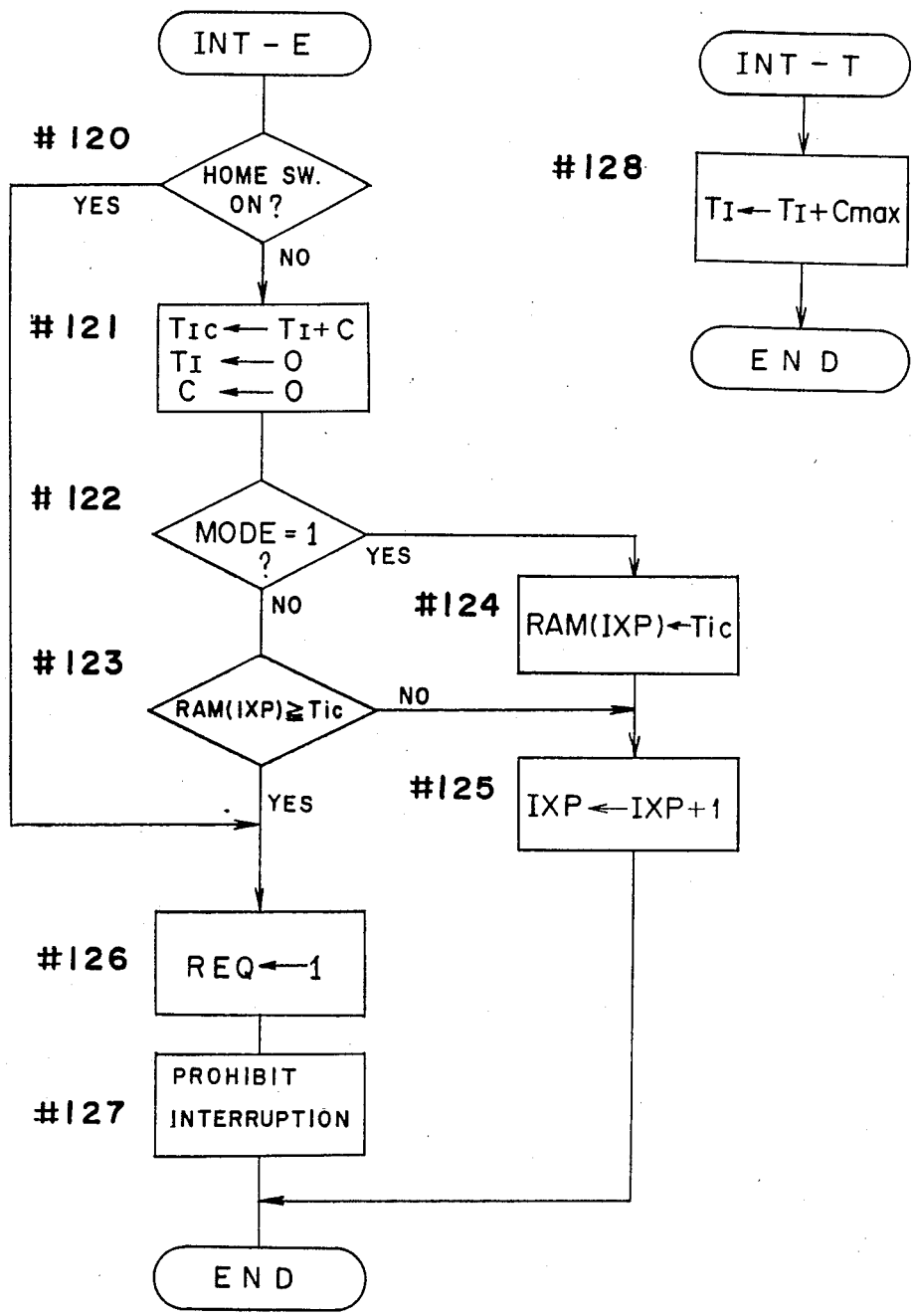

SYSTEM FOR CONTROLLING THE RECIPROCATION OF A SCANNING ARRANGEMENT

BACKGROUND OF THE INVENTION

1. Field of the Invention

The present invention relates to an image transmitting device for use in an electrophotographic copying machine, image reading machine, or the like and, more particularly, it relates to a control system for controlling the reciprocation of a scanning arrangement, wherein the scanning arrangement scans an original document in a programmed manner so as to sequentially transmit images of the original document in slits onto a photoreceptor surface.

2. Description of the Prior Art

Generally, an electrophotographic copying machine or an image reading machine has a platen or a support for holding an original document, and a scanning arrangement for scanning across the original document in slits. The scanning arrangement includes a source of light producing light beams in a form of a ribbon that impinges on the original document and an image transmitting device for transmitting the image, i.e., reflected light beams from the original document to the photoreceptor surface. The image transmitting device is defined by a pair of mirror devices, or a movable lens device (such as disclosed in U.S. Pat. No. 3,584,950 to Gundlach), and a driving device for driving such a transmitting device. When the transmitting device is defined by two mirror devices, the driving device moves the mirror devices in predetermined different speeds. For example, the two mirror devices move at different speeds having a ratio of 2 to 1, thereby effecting a complete scan over of the original document and, thereafter, returning the scanning arrangement back to its initial position.

According to the prior art, the scanning arrangement is coupled to a main motor through a suitable clutch device which may take one of three different positions: a neutral position; a forward transmitting position; and a reverse transmitting position. When the clutch device is in the neutral position, no driving force is transmitted to the scanning arrangement.

When the clutch device is in the forward transmitting position, the scanning arrangement is moved at the constant speed for effecting a scanning operation. More specifically, when the clutch device is shifted from the neutral position to the forward transmitting position, the scanning arrangement starts to move from its initial or home position, and its speed is accelerate until it reaches a predetermined constant speed. The acceleration of the scanning arrangement is carried out in a predetermined distance, hereinafter referred to as a pre-running distance. During the acceleration, the speed of the scanning arrangement is not constant, thus it is not suitable to carry out the image transmission during this period. When the scanning arrangement moves past the pre-running distance, it is moved at a constant speed for carrying out the image transmission from the original document to the receiving surface.

When the scanning arrangement completes one scan, the clutch device is shifted to the reverse transmitting position, thereby returning the scanning arrangement back to its initial position as quickly as possible ready for the next scanning operation.

In recent years many approaches have been made to improve the copying machine, such as to speed up the copying operation, to make the copy as precise as the original, and to minimize the copying machine. To accomplish such approaches, it is required to present an improved scanning arrangement that can scan fast with a high stability and a high preciseness, and that returns back to the initial position with less deviation. Furthermore, it is required to make the pre-running distance as short as possible.

To speed up the copying operation, the returning speed is made much faster than the scanning speed. But, when this is done, it is necessary to give a braking effect in a highly controlled manner, or otherwise, the scanning arrangement stops at a position highly deviated from its home position. If the scanning arrangement fails to return precisely to its initial position, it is necessary to provide means for setting the scanning arrangement to the home position, or to provide a wide home position so that the scanning arrangement has a pre-running distance sufficiently long to accelerate the scanning arrangement to the required speed even when the scanning arrangement is stopped at the position much deviated towards the scanning area. The employment of the setting means or the long prerunning distance results in increase of manufacturing parts or the size of the copying machine. Furthermore, it fails to speed up the copying operation.

To overcome the above disadvantages, a various improved systems have been proposed, such as employing a servo-control system having a pulse motor or a D.C. motor, and such improvements are disclosed in, for example: U.S. Pat. No. 4,332,461 to Cail et al.; U.S. Pat. No. 4,287,461 to Promis et al.; and U.S. Pat. No. 4,371,254 to Beery.

In the proposed systems, however, a memory means is provided which stores information of proper speed and position of the scanning arrangement throughout the operation, and a servo-control that controls the actual speed and position to be the same as those stored in the memory means. The system according to Beery has a control means that controls only the return movement of the scanning arrangement, wherein the speed and position are controlled by the use of grating.

The prior art systems have disadvantages such that a memory means having a large capacity must be used, and that the structure is complicated.

Another improved system is proposed and it is disclosed in, e.g., U.S. Pat. No. 4,280,763 to Arai et al. wherein a train of pulses are generated at a pitch corresponding to the speed of the scanning arrangement, and such a train of pulses are used not only for detecting the speed of the scanning arrangement but also for detecting the position of the scanning arrangement by the use of a suitable counting means. According to one embodiment of Arai, a disk having slits formed therearound is provided for intermittently cutting a light beam, thereby producing a train of pulses. According to another embodiment of Arai, a disk having small magnets mounted therearound is provided of producing a similar train of pulses. In either one of the embodiments, it is preferable to make the frequency of the pulses as high as possible so as to improve the detecting accuracy. To this end, one may take a method either or both of:

(1) narrowing the pitch of the slits or magnets; and/or (2) providing means for detecting both the leading edge and trailing edge of each pulse.

According to the method (1), the detecting accuracy cannot be improved more than a certain degree, because of mechanical restriction. Also, according to the method (2), the detecting accuracy can be improved only when the duty ratio of the pulses is made exactly 50%, and this requirement is very difficult to meet from the mechanical and electrical point of view.

SUMMARY OF THE INVENTION

The present invention has been developed with a view to substantially solving the above described disadvantages and has for its essential object to provide an improved control system for reciprocation of scanning arrangement.

It is also an essential object of the present invention to provide an improved control system for reciprocation of scanning arrangement having a simple arrangement and a simple control system.

It is a further object of the present invention to provide an improved control system for reciprocation of scanning arrangement wherein a scanning arrangement moves fast with a high stability.

In accomplishing these and other objects, a control system for reciprocation of scanning arrangement according to the present invention comprises a scanning device for scanning an original from a home position across the original to a scanned position and returning it from the scanned position back to the home position, a D.C. motor for driving the scanning device, and a switching circuit for providing electric power to the D.C. motor. A control device is coupled to the switching circuit for controlling the speed of the scanning device such that: the scanning device scans across the original at a predetermined constant speed; when it reaches the scanned position, the scanning device starts to return back towards the home position with an incessant supply of power having a predetermined level; and thereafter it is gently returned back to the home position with less deviation.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 1b is a cross sectional view taken along a line Ib–Ib shown in FIG. 1a;

FIGS. 11a and 11b show interruption routines according to the second embodiment of the present invention;

DESCRIPTION OF THE PREFERRED EMBODIMENTS

Figure 1A:
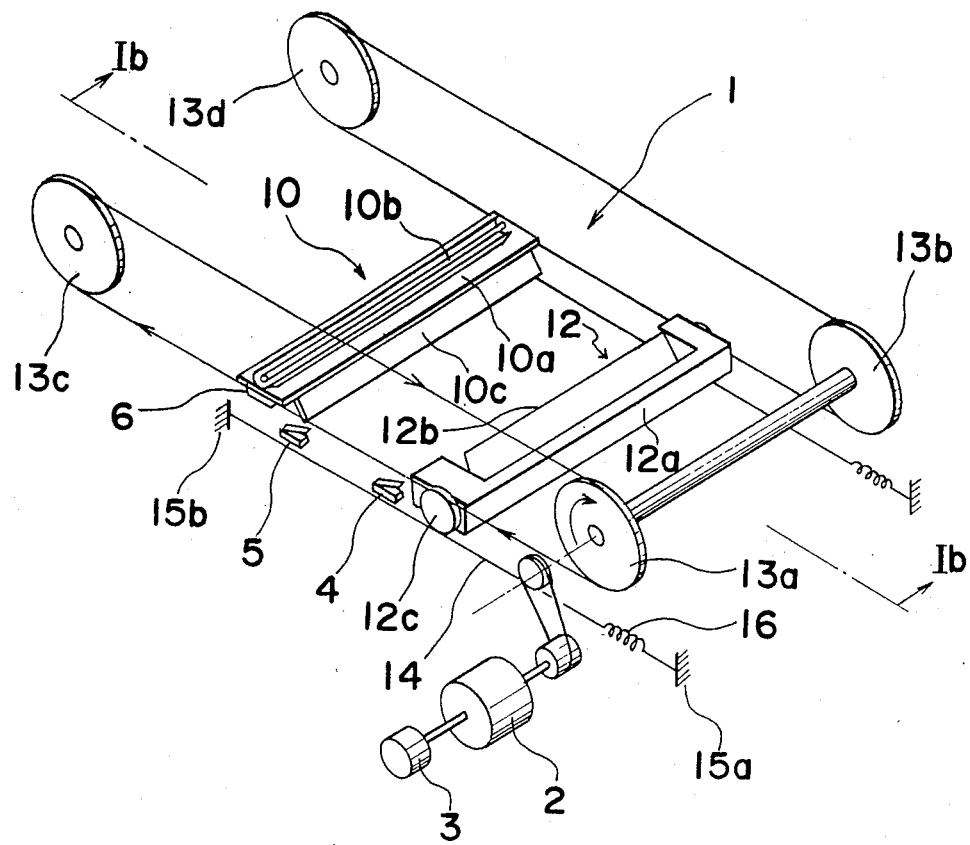
FIG. 1a is diagrammatic view of a scanning arrangement employed in an electrophotographic copying machine.
Figure 1B:
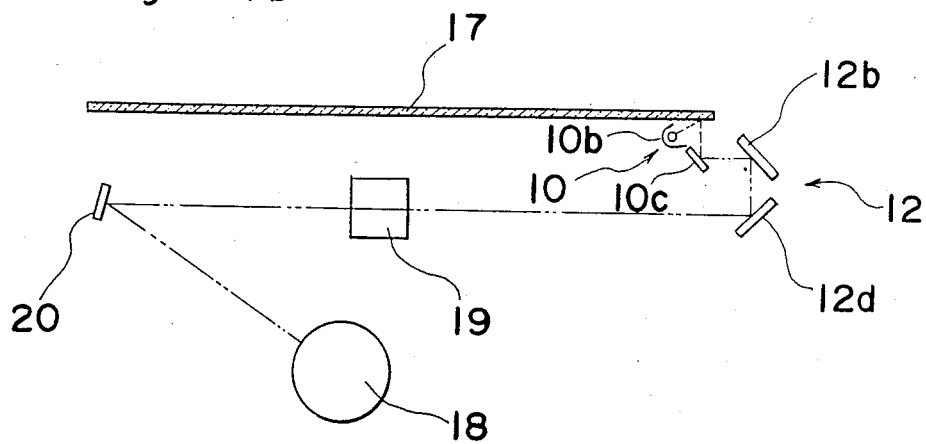

Referring to FIGS. 1a and 1b, a scanning arrangement 1 according to the first embodiment is shown for use in a copying machine of a type capable of making copies of various sizes in various magnifications. The scanning arrangement 1 comprises a first carrier 10 and a second carrier 12. The first carrier 10 includes a carrier support 10a, on which a light source 10b is mounted on one side, and a first mirror 10c is mounted along the side thereof. The second carrier 12 includes a carrier support 12a, on which second and third mirrors 12b and 12d are mounted along the side thereof, and a pair of rolls 12c mounted on the opposite ends. A ribbon of light emitted from the light source 10b reflects on an original document (not shown) on a platen 17 and further reflects on the first, second and third mirrors 10c, 12b and 12d, and is directed towards a photoreceptor surface 18 through a projection lens 19 and fixed mirror 20.

The scanning arrangement 1 further includes a D.C. motor 2 designed to rotate in two directions, an encoder 3 connected to the D.C. motor 2 for producing a train of pulses having a frequency corresponding to the speed of the D.C. motor 2. The rotating force of the motor 2 is transmitted, through a suitable transmission means, to a first pair of wheels 13a and 13b which are axially connected to each other and are journalled to a housing (not shown). The first pair of wheels 13a and 13b are located at one end of the scanning arrangement 1, and a second pair of wheels 13c and 13d are provided at the other end of the scanning arrangement.

A string 14 is connected to the housing at a point 15a, and extends around the roll 12c and the wheel 13a. The string 14 further extends around the wheel 13c and the roll 12c, and is connected to the housing at a point 15b. To keep the string 14 tightly extended, a suitable spring 16 is provided. Between the wheel 13c and the roll 12c, the string 14 is fixedly connected to the carrier support 10a. As shown in FIG. 1, another string is provided on the other side of the scanning arrangement 1.

Switches 4 and 5 are provided along the path of the first carrier 10 so that a cam 6 provided on the carrier support 10a actuates the switches 4 and 5 during the movement of the first carrier 10 in a manner which will be described later. The switch 4, referred to as a home switch, is provided for detecting when the scanning arrangement 1 is moved to its home position, and the switch 5, referred to as a brake switch, is provided for start braking the scanning arrangement 1 during the return movement of the scanning arrangement 1.

When the wheels 13a and 13b rotate in a direction shown, the string 14 moves in a direction shown at a speed f. Thus, the first carrier 10 connected to the string 14 moves at the speed f. Because the string 14 is provide around the roll 12c, the second carrier 12 moves at the speed f/2 in the same direction as the direction of move of the first carrier 10. When the scanning arrangement is in the home position, the first carrier 10 is shifted towards the first pair of wheels 13a and 13b such that the cam 6 is located in a position to actuate the home switch 4.

From the home position, the first carrier 10 moves towards and close to the second pair of wheels 13c and 13d, and thereafter, it returns back towards the home position. After the return for a certain distance, that is, when the carrier 10 actuates the braking switch 5, a braking effect is provided to the carrier 10, and such a braking effect is continued for a programmed period of time, as will be described in detail later. When the carrier 10 is braked down to a certain low speed, it gently returns to the home position with less deviation. The above described movement of the first carrier 10 accompanies the movement of the second carrier 12, but in half the speed of the first carrier 10.

Figure 4:
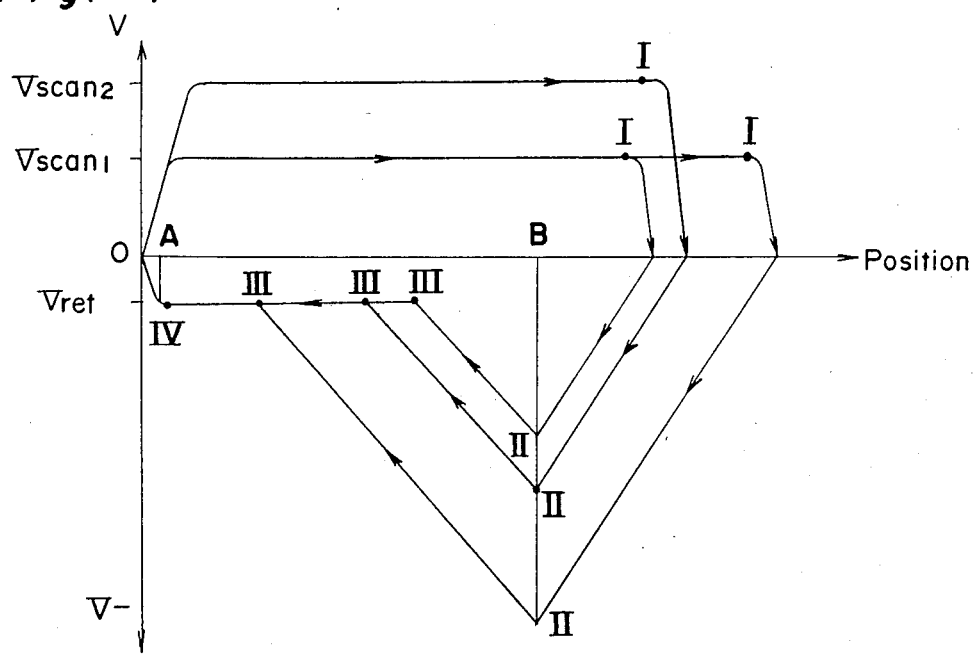
FIG. 4 is a graph showing a pattern of movement of a scanning arrangement according to the first embodiment of the present invention.

When particularly observing on the first carrier 10, the movement of the carrier 10 can be diagrammatically depicted as shown in the graph of FIG. 4, wherein abscissa and ordinate represent, respectively, position and speed. In the graph, the position 0 is the home position, position A is the place where the home switch 4 locates, and the position B is the place where the brake switch 5 becomes actuated by the cam 6. Starting from the position 0, the carrier 10 is accelerated up to a speed, e.g., $Vscan_1$ by an electric power incessantly applied to the motor 2, within the pre-running distance and, thereafter, it is moved at the constant speed $Vscan_1$ by an electric power intermittently applied to the motor 2. Then, at a point I, the carrier 10 is forced to return back, and the returning force is given constantly until the carrier 10 is moved to the position B, i.e., until a point II. Thereafter, a braking effect is given to the carrier 10 until its speed is reduced to Vret, i.e., until a point III. Then, the carrier 10 is further returned back at the constant speed Vret until it is moved to the position A, i.e., until a point IV. Thereafter, the carrier 10 is again braked to return it exactly to the initial position, i.e., the home position. The above described movements of the first carrier 10 is effected by the D.C. motor 2, and the driving of the motor 2 is controlled by a control system described in detail below.

Figure 2:
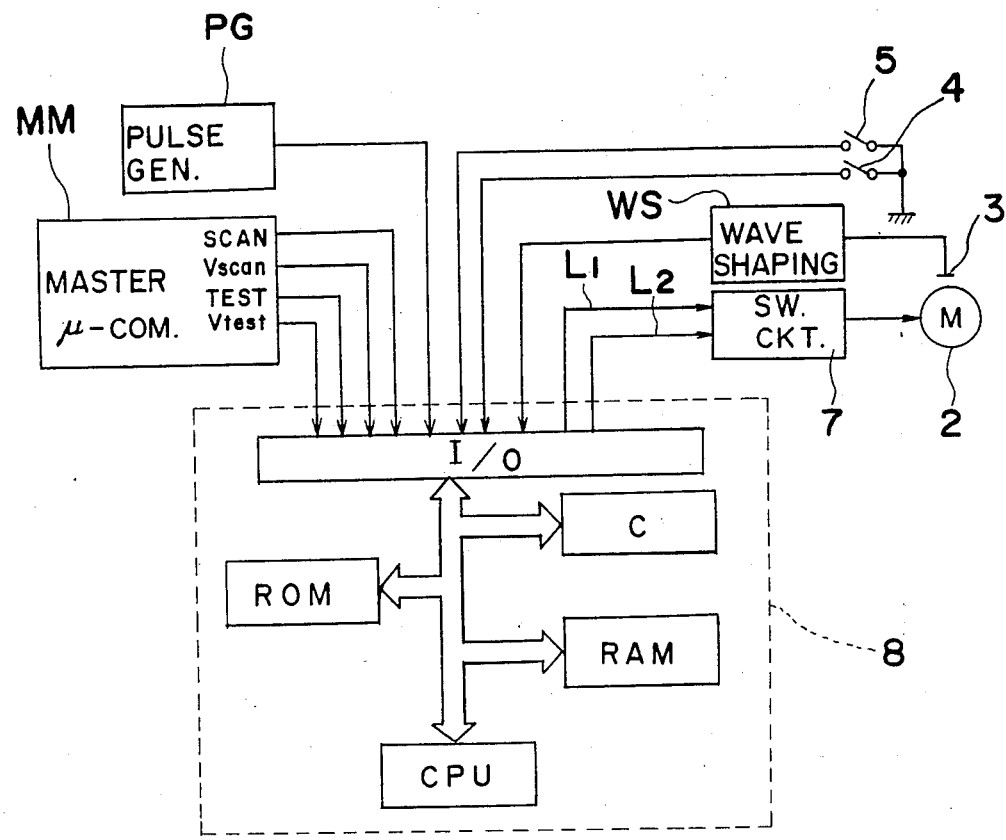
FIG. 2 is block diagram showing a control system for reciprocation of scanning arrangement according to the present invention.

Referring to FIG. 2, a block diagram of a control system for controlling the motor 2 comprises a master computer MM, a micro-computer 8, a pulse generator PG for generating a train of clock pulses, a wave shaping circuit WS for wave shaping the pulses obtained from the encoder 3, and a switching circuit 7 for driving the motor 2.

The master computer MM is provided for controlling the various operations, such as paper feeding operation and image forming operation, etc., in a predetermined sequence to carry out the copying operation. And in a synchronized manner with such sequential operations, the master computer MM produces signals SCAN and Vscan at predetermined timed relations with other operations, and the signals SCAN and Vscan are applied to the micro-computer 8. The SCAN signal is used for determining the moment when to start moving the scanning arrangement, and the signal Vscan is used for determining the scanning speed of the scanning arrangement. It is to be noted that the signal Vscan is determined by the magnification of the copy. The master computer MM further produces signals TEST and Vtest in a synchronized manner with the sequential operations, particularly for use in the second embodiment.

The micro-computer 8 includes an input and output port I/O, a read-only-memory ROM, a central-processing-unit CPU, a random-access-memory RAM, and a counter C having a capacity of, e.g., 8-bits. In addition to the above-mentioned signals SCAN, Vscan, TEST and Vtest, the micro-computer 8 further receives clock pulses from the pulse generator PG, a train of pulses representing the speed of the scanning arrangement from the encoder 3 through the wave shaping circuit WS, and timing signals from the home switch 4 and the braking switch 5. By using the clock pulses from the pulse generator PG, the micro-computer 8 counts the time interval between two pulses from the encoder 3, thereby detecting the speed of the scanning arrangement. And, by using these and other signals, the micro-computer 8 produces control signals which are provided to the switching circuit 7, which drives and brakes the D.C. motor 2, through lines L1 and L2.

Figure 3:
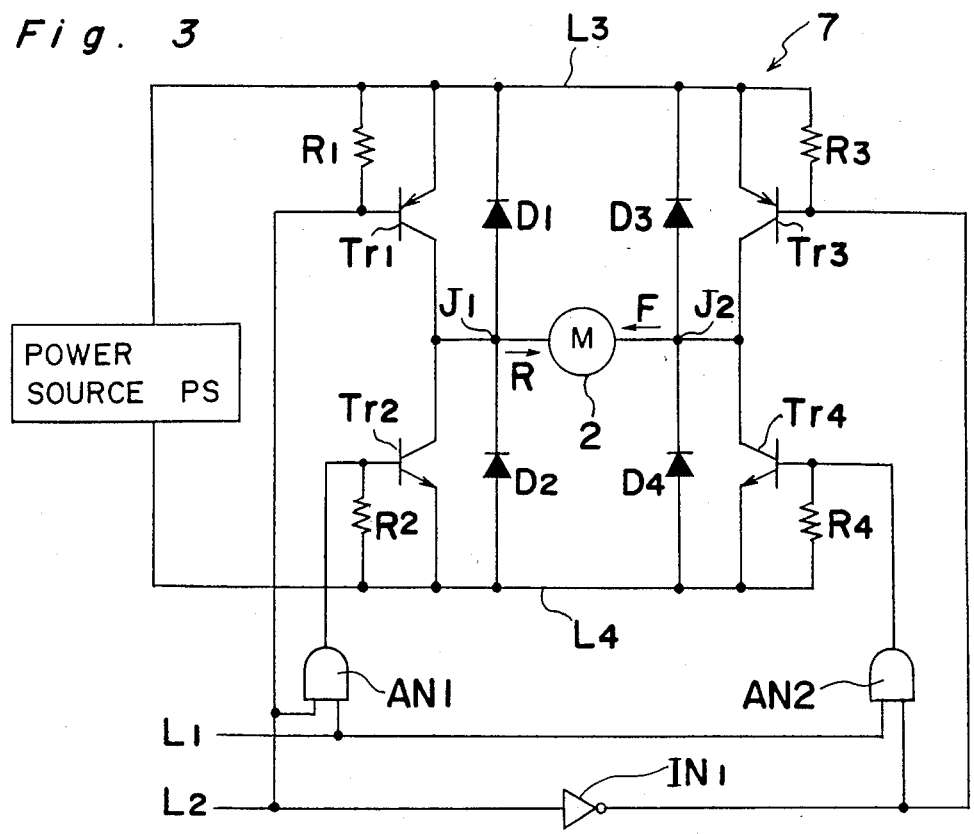
FIG. 3 is a circuit diagram of a switching circuit shown in FIG. 2.

Referring to FIG. 3, the switching circuit 7 comprises a power source PS for supplying D.C. power from a line L3 to a line L4. The power source PS is designed for providing power equal to or less than the maximum rated power of the motor 2, thereby preventing the motor 2 from being damaged even during the return movement of the scanning arrangement. Across the lines L3 and L4, diodes D1 and D2 are connected in series in reverse bias direction, and diodes D3 and D4 are connected in series in reverse bias direction. A junction J1 between the diodes D1 and D2 is connected to one end of the D.C. motor 2, and a junction J2 between the diodes D3 and D4 is connected to the other end of the D.C. motor 2. Transistors TR1 and TR3 are connected parallelly to the diodes D1 and D3, respectively, with resistors R1 and R3 connected between the base thereof and the line L3. Similarly, transistors TR2 and TR4 are connected parallelly to the diodes D2 and D4, respectively, with resistors R2 and R4 connected between the base thereof and the line L4.

The line L1 from the micro-computer 8 is connected to one input of an AND gate AN1 and also to one input of another AND gate AN2. The line L2 from the micro-computer 8 is connected to the other input of the AND gate AN1, and also to the base of the transistor Tr1. The line L2 is further connected through an inverter IN1 to the other input of the AND gate AN2 and also to the base of the transistor Tr3. The output of the AND gate AN1 is connected to the base of the transistor Tr2, and the output of the AND gate AN2 is connected to the base of the transistor Tr4. Depending on the combination of HIGH and LOW signals appearing on the lines L1 and L2, the switching circuit 7 shown in FIG. 3 takes one of four different modes of operations, which are: forward mode effected during the movement of the first carrier 10 between the points 0 and I shown in FIG. 3; reverse drive mode effected during the movement of the first carrier 10 between the points I and II; brake mode effected during the movement of the first carrier 10 between the points II and III, and between the points IV and 0; and reverse mode effected during the movement of the first carrier 10 between the points III and IV.

The forward mode is accomplished when the line L2 carries HIGH, and the line L1 continues to carry HIGH, or alternately HIGH and LOW at a predetermined frequency depending on the required speed. More particularly, when both lines L1 and L2 carry HIGH, the transistors Tr3 and Tr2 are turned to conductive state, and the transistors Tr1 and Tr4 are turned to non-conductive state, thereby allowing current flow from the line L3 through the transistor Tr3, motor 2 and transistor Tr2 to the line L4. Thus, by the current flow in the direction indicated by an arrow F, the motor 2 is driven incessantly in the forward direction, thereby accelerating the scanning arrangement. But, when the line L2 carries HIGH and the line L1 alternately carries HIGH and LOW, the motor 2 is driven intermittently in the forward direction, thereby moving the scanning arrangement forwardly at a constant speed.

The reverse drive mode is accomplished when the line L2 carries LOW, and the line L1 carries HIGH. In this mode, the transistors Tr1 and Tr4 are turned to conductive state and the transistor Tr2 and Tr3 are turned to non-conductive state, thereby allowing current flow from the line L3 through the transistor Tr1, motor 2 and transistor Tr4 to the line L4. Thus by the current flow in the direction indicated by an arrow R, the motor 2 is driven incessantly in the reverse direction, effecting the rapid return of the scanning arrangement.

The brake mode is accomplished when the line L2 carries HIGH, and the line L1 carries LOW. In this mode, only the transistor Tr3 conducts and the transistors Tr1, Tr2 and Tr4 are turned to non-conductive state. Since the brake mode takes place after the reverse drive mode, the brake mode is presented when the scanning arrangement moves towards the reverse direction at a high speed. Therefore, in this case, the motor 2 operates as a generator producing regenerated current in the direction F. The regenerated current flows through the transistor Tr3, motor 2 and diode D1, and generates the counter electromotive force effective to braking.

The reverse mode is accomplished when the line L2 carries LOW and the line L1 carries alternately HIGH and LOW at a predetermined frequency. In the reverse mode, the transistor Tr1 is maintained conductive, and the transistors Tr2 and Tr3 are maintained non-conductive. Furthermore, the transistor Tr4 alternately turned conductive and non-conductive. Accordingly a current intermittently flows through the motor 2 in the direction R, thereby moving the scanning arrangement in the reverse direction at a constant speed.

Next, a program given to the micro-computer 8 for controlling the scanning arrangement is described in connection with the flow chart shown in FIGS. 5a, 5b and 5c.

In summary, the steps #3 to #8 are provided to return the scanning arrangement properly to the home position, just in case if the scanning arrangement is undesirably deviated from the home position. The steps #9 to #15 are provided to carry out the scan movement between the points 0 and I shown in FIG. 4 at a desired speed $Vscan_1$, $Vscan_2$ or any other speed (generally indicated as Vscan), depending on the magnification of enlargement or reduction of a copy. The steps #16 and #17 are provided to carry out the return movement between the points I and II shown in FIG. 4 under the full power driving of the motor 2. The steps #18 to #21 are provided to give braking effect to the scanning arrangement as carried out between the points II and III, and the steps #22 to #25 are provided to gently return the scanning arrangement at a constant low speed to the home position as carried out between the points III and 0.

Figure 5A:
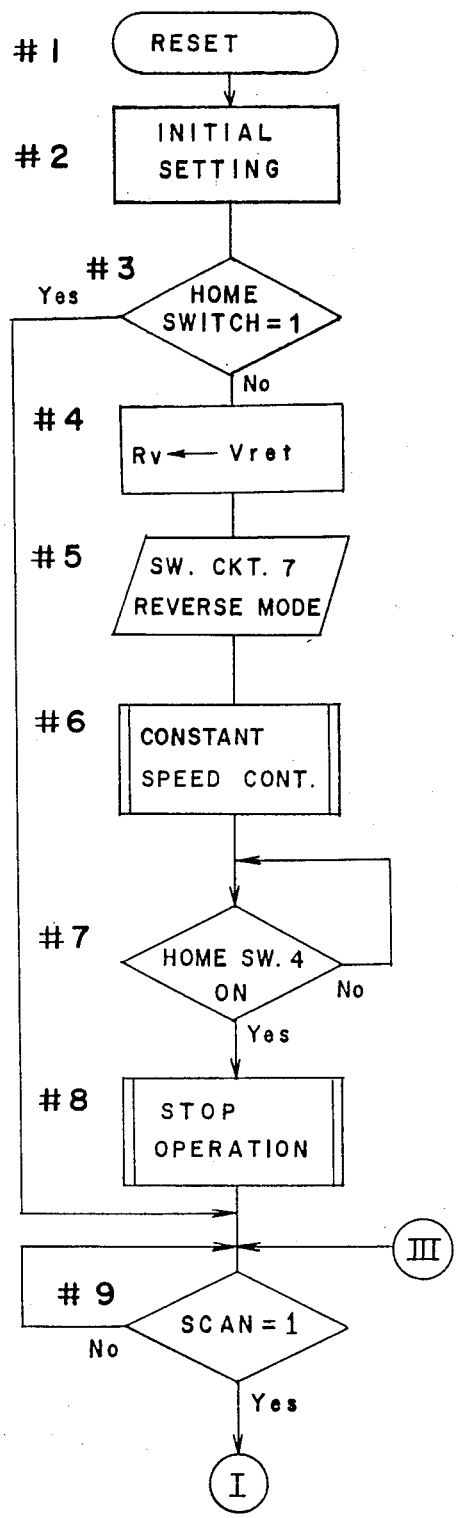
FIGS. 5a, 5b and 5c are flow charts of a main routine according to the first embodiment of the present invention.
Figure 5B:
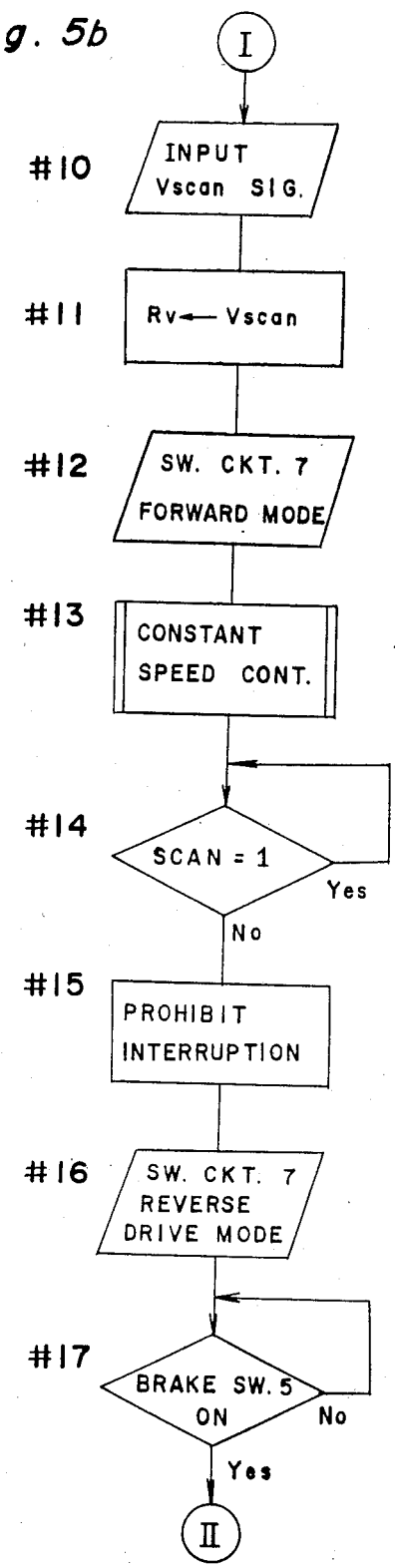
Figure 5C:
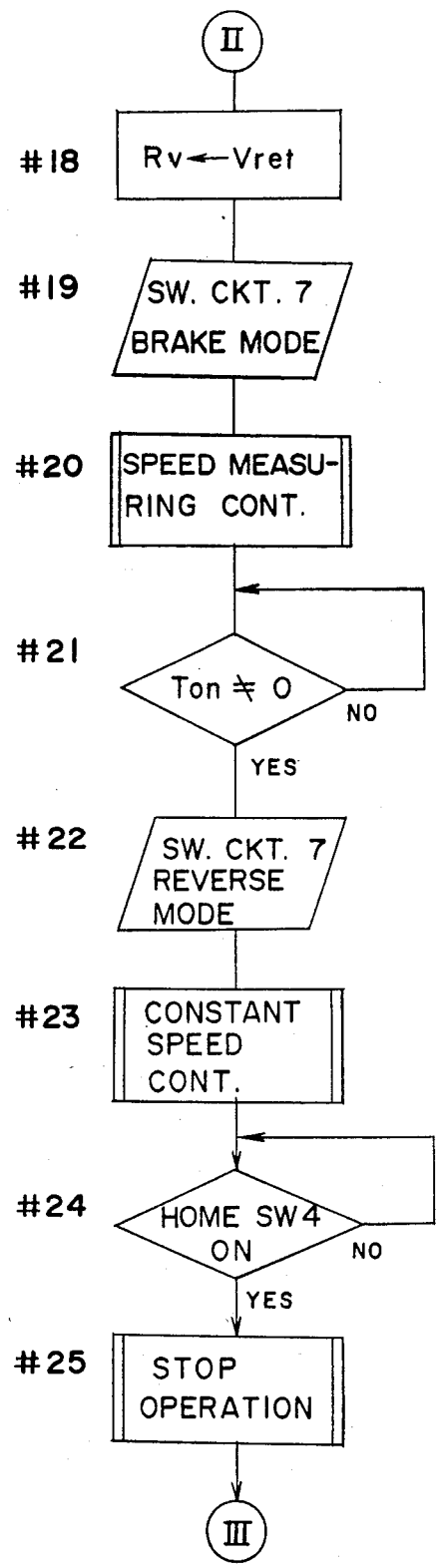

Referring particularly to FIG. 5a, when a main switch (not shown) is turned on, the program resets the micro-computer 8 at the step #1 and, thereafter, it effects the initial setting. Then, at the step #3, it is discriminated whether the home switch 4 is producing "1" or not. If the home switch 4 is producing "1", indicating that the scanning arrangement is properly located at the home position, the program advances to the step #9, and waits until the micro-computer 8 receives a signal SCAN from the master computer MM. Contrary, if the home switch 4 is producing "0", indicating that the scanning arrangement is not located properly at the home position, steps #4 to #8 are taken to bring it to the home position, as described below.

In the step #4, a returning speed Vret is set up in a register Rv as a required speed for moving the scanning arrangement. Here, it is to be noted that a suitable stopper is provided at the home position, so that the scanning arrangement deviates only towards the scanning direction. Then, in the step #5, the micro-computer 8 sets the switching circuit 7 in the reverse mode, and in the step #6, the switching circuit 7 is so powered as to move the scanning arrangement back to its home position. In the step #6, a sub-routine procedure as shown in FIG. 6a is carried out to effect such a return movement.

Figure 6A:
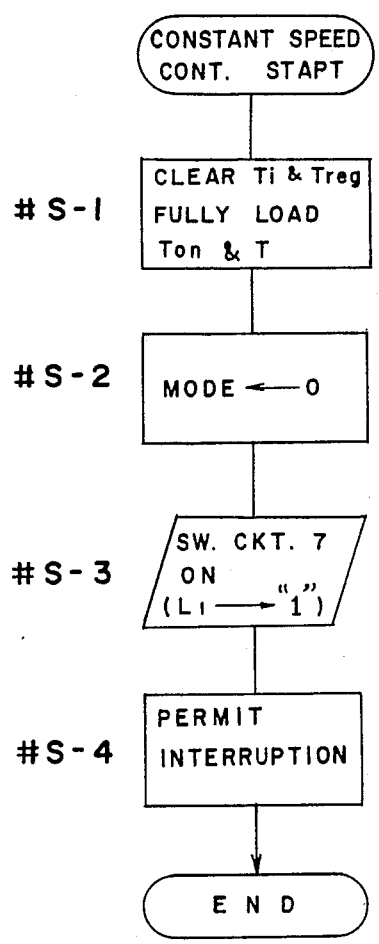
FIGS. 6a, 6b and 6c show sub routines to be effected for the main routine shown in FIGS. 5a, 5b and 5c.

Before describing the sub-routine procedure of FIG. 6a, it is to be noted that the micro-computer 8 is provided with following elements:

Timer Ti: A timer for counting clock pulses for measuring pulse spacing between two consecutive pulses from the encoder 3.

Timer Ton: A timer for storing a time previously set from the leading edge of each pulse from the encoder 3. A content of the timer Ton is subtracted by a content of a timer T at every interruption routine INT-T. During the timer Ton still holding its content the micro-computer 8 produces HIGH on the line L1, thereby controlling the intermittent or incessant drive of the motor 2.

Register Treg: A register defined by an 8-bit up counter. It counts up the clock pulses from the pulse generator PG. According to one embodiment, the clock pulses have a frequency of 200 KHz and, therefore, it takes 1.28 ms to fill up the register Treg, i.e., to count $2^8 = 256$ pulses.

Timer T: A timer for storing the content of the register Treg.

Register Rv: A register for storing speed signal Vret or Vscan received from the master computer.

Referring to FIG. 6a, at the step #S-1, an initial setting is carried out, such that the timer Ti and the register Treg are cleared to zero, and the timer Ton and the timer T are loaded to their maximum available amount. Thus, the timer T is loaded with $2^8 = 256$ bits.

Then, at the step #S-2, a flag MODE carries "0" indicating that the mode is a constant speed control mode.

This information will be used in an interruption routine INT-E, which will be described in detail later in connection with FIG. 7b.

Next, at the step #S-3, the switching circuit 7 is turned on and the lines L1 and L2 carry HIGH and LOW, respectively, whereby the motor 2 is provided with power, ready for moving the carrier arrangement towards the home position.

Figure 7A:
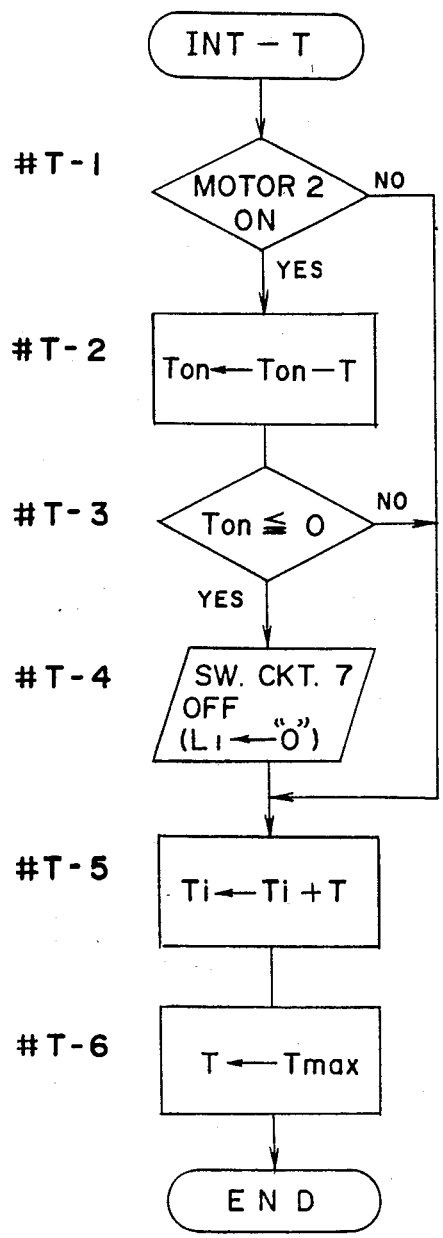
FIGS. 7a and 7b show interruption routines according to the first embodiment of the present invention.

At the step #S-4, it is permitted to carry out timer interruption routine INT-T and external interruption routine INT-E. The timer interruption routine INT-T, which will be described in detail later in connection with FIG. 7a, is effected when the register Treg has counted the clock pulses up to the maximum. In other words, when the register Treg has counted $2^8=256$ clock pulses, the procedure temporarily jumps to the interruption routine INT-T and, at the same time, the register Treg is cleared to start counting from the beginning. The external interruption routine INT-E, which will be described in detail later in connection with FIG. 7b, is effected in response to each pulse generated from the encoder 2.

When the interruption routine INT-T or INT-E takes place, the procedure of the main routine temporarily stops, and when the interruption routine is completed, the program returns back to the main routine. In the case where one interruption routine, such as INT-T, is requested during the other interruption routine INT-E is taking place, said one interruption routine INT-T will be carried out immediately after the interruption routine which is now taking place. If both interruption routines INT-T and INT-E are requested at the same time, the external interruption routine INT-E is carried out first, and then, the timer interruption routine INT-T is carried.

When the above described procedure is completed, the scanning arrangement starts to move towards the home position, and by the rotation of the motor 2 the encoder 3 starts to produce pulses after making a predetermined degree of rotation. Since the speed of the motor 2 at the starting moment is very slow, the register Treg counts up to the maximum before the first pulse from the encoder 3 is produced. When the register Treg counts up to the maximum, it is automatically cleared to zero and starts to count up again from the beginning, and, at the same time, the timer interruption routine INT-T is effect, thereby the program jumps from the main routine to the interruption routine INT-T described below.

Referring to FIG. 7a, when the interruption routine INT-T starts, it is first discriminated, in the step #T-1, whether the motor 2 is on or not. When the motor 2 is on, the program advance to the step #T-2 wherein the content of the timer Ton is subtracted by a content of the timer T, i.e., an amount equal to the maximum content of the register Treg.

Then, in the step #T-3, it is discriminated whether the content of the timer Ton is smaller than or equal to zero, or not. If it is yes, the program advances to the step #T-4 wherein the switching circuit 7 is turned off by producing LOW on the line L1, thereby stopping the motor 2 and, thereafter, the program advance to the step #T-5. Contrary, if it is no, the program jumps from step #T-3 to step #T-5 without turning the switching circuit 7 off.

In the step #T-5, the content of the timer T, i.e., an amount equal to the maximum content of the register Treg is added to the content of the timer Ti. Then, in the step #T-6, the timer T is stored with the maximum content of the register Treg and, according to the present embodiment, it is $2^8=256$. Then, the timer interruption routine INT-T ends, thereby returning back to the main routine.

Then, when the motor speed increases, the encoder 3 produces a train of pulses and, in response to each pulse, the external interruption routine INT-E takes place with the steps described below.

Figure 7B:
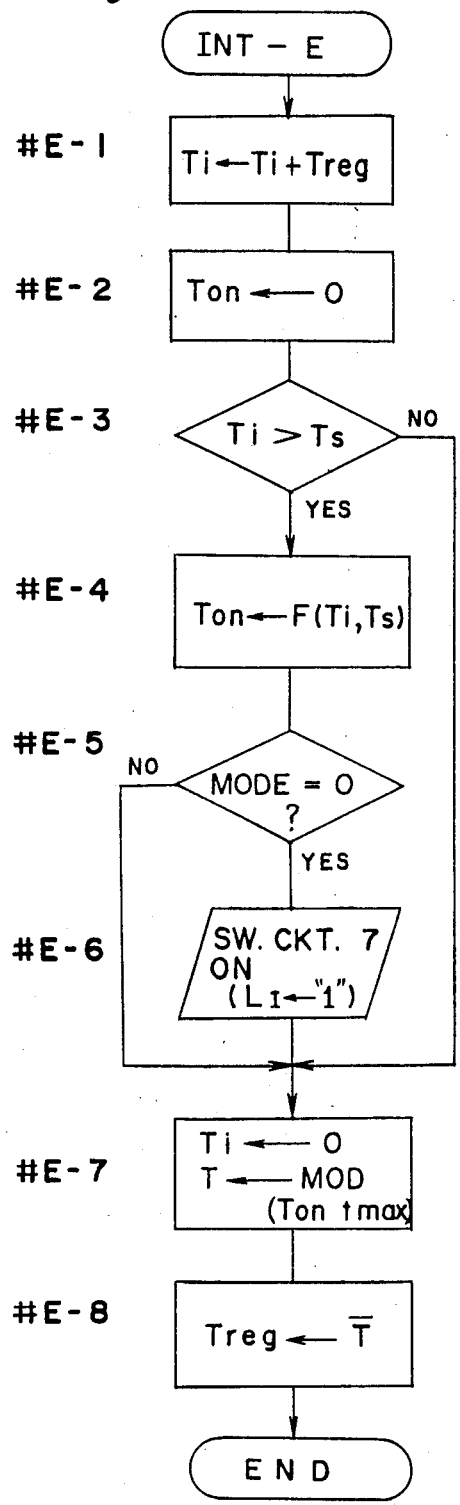

Referring to FIG. 7b, when the external interruption routine INT-E starts, the timer Ti is added with the present content of the register Treg, thereby obtaining the pulse spacing between two consecutive pulses from the encoder 3. In the step #E-2, the timer Ton is temporarily cleared to zero. Then, the content of the timer Ti and the previously set amount Ts for producing the desired speed V are used in an equation F(Ti, Ts) to calculate a time for turning the motor on by way of pulse width modulation, thereby controlling the motor at the desired speed. According to the present embodiment, if the present speed is faster than the required speed, a time relative to the difference therebetween is obtained by the use of the equation F(Ti, Ts). In the step #E-4, the timer Ton is loaded with the time calculated through the equation F(Ti, Ts). It is to be noted that, when the speed is very fast, the calculation can not be carried out with the use of the equation F(Ti, Ts). In such a case, the program advances from the step #E-3 to #E-7, thereby continuously holding zero in the timer Ton. When the amount of the timer Ton is determined, since the mode is set to "0" in the step #E-5, the motor is turned on at the step #E-6. Thereafter, in the step #E-7, to measure the time until the generation of a next pulse from encoder 3, the timer Ti is set with "0" and, at the same time, a remainder MOD of a division: (content of timer Ton)/(maximum content Tmax of timer Treg) is store in the timer T, and a complement $\overline{T}$ of such a remainder MOD, i.e., $\overline{T}=$Tmax$-$MOD, is stored in the register Treg in the step #E-8. As a result, the time obtained by the equation F(Ti, Ts) is equal to an amount converted to the number of frequency of the clock pulses. When the register Treg and the timers T, Ti and Ton are set, one external interruption routine INT-E completes.

As understood from the foregoing description, the pulse spacing of the pulses from the encoder 3 is measured so as to obtained the present speed of the motor 2. The obtained present speed of the motor 2 is compared with the required speed, and when it is above the required speed, a power supplying period in each cycle (between two consecutive pulses from the encoder 3) is reduced such that the duty ratio of the power supplying period is reduced. Contrary, when the present motor speed is below the required speed, the duty ratio of the power supplying period is increased. Thus, by way of pulse width modulation, the motor speed is controlled, thereby controlling the speed of the scanning arrangement.

According to one embodiment, the equation F(Ti, Ts) can be given as follows:

$$F(Ti, Ts) = K(Ti - Ts),$$

wherein k is a constant having a value suitable to provide an appropriate duty ratio. In practice, other factors can be added to the equation so as to correct frictional loss or to match with various characteristics of the motor 2, such as acceleration characteristics.

As understood from the above, the constant speed is controlled by a sub-routine shown in FIG. 6a and interruption routines shown in FIGS. 7a and 7b. While the constant speed control is carried out by the sub-routine, the main routine shown in FIG. 5a continues to watch when will the home switch 4 be turned on, in the step #7. When the home switch 4 turns on, the program advances to the step #8 wherein a stop operation is carried out for stopping the scanning arrangement.

Figure 6B:
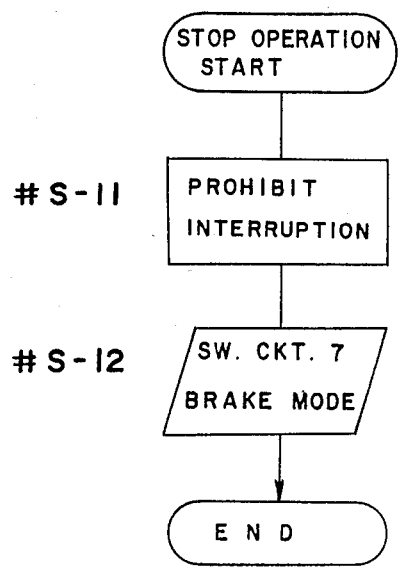

Referring to FIG. 6b, the stop operation is carried out through another sub-routine which comprises, the step #S-11 for prohibiting any interruption routines, thereby completing the constant speed control, and the step #S-12 for setting the switching circuit 7 to the brake mode. According to the present embodiment, since the required speed to return the scanning arrangement to the home position is set to a very low speed, the braking distance is very short. Therefore, the scanning arrangement stops immediately after the mode is set to the brake mode, no matter how long the scanning arrangement has been shifted.

Returning back to FIG. 5a, when the scanning arrangement is properly returned to the home position, the micro-computer 8 waits until the master computer MM produces a SCAN signal. This is done in the step #9, wherein the program watches whether the SCAN signal is present or not. When the SCAN signal comes, the micro-computer 8 immediately receives scan speed signal Vscan from the master computer MM in the step #10, and stores the received scan speed signal Vscan in a register Rv in the step #11. Then, in the step #12, the switching circuit 7 is turned to the forward mode and, in the step #13, the sub-routine procedure for the constant speed control is effected. This sub-routine procedure is the same as that described above in connection with FIG. 6a.

The speed of the scanning arrangement is maintained constant during the interruption routines INT-T and INT-E are carried in the sub-routine of FIG. 6a at the step #S-4. And, in the meantime, the distance of movement of the scanning arrangement is being watched in the step #14 of the main routine (FIG. 5a). More particularly, in the step #14, it is discriminated whether the signal SCAN is still present or not. When the scanning arrangement is scanned to its destination, which is different depending on the size of the original document to be scanned, the signal SCAN disappears or it is changed from HIGH to LOW. Thereupon, the program advances to the step #15 for prohibiting any insertions, thereby stopping the constant speed control.

Immediately thereafter, the program advances to the step #16, wherein the switching circuit 7 is changed to the reverse drive mode. Accordingly, the scanning arrangement, which has been moving forwardly at the constant speed, is applied with a force in the reverse direction. Thus, the scanning arrangement is braked, and when it stops, it is accelerated to move in the reverse direction, as in a manner shown between points I and II in FIG. 4. As understood from FIG. 4, the speed of the scanning arrangement increases gradually between points I and II. During the movement of the scanning arrangement in the reverse direction and, when the scanning arrangement actuates the brake switch 5, the program advances from the step #17 to step #18, wherein the data stored in the register Rv is renewed from Vscan to Vret, just received from the master computer MM. Then, in the step #19, the switching circuit 7 is changed to the brake mode, thereby the scanning arrangement gradually becomes slow. Then, in the step #20, speed measuring procedure is carried out.

Figure 6C:
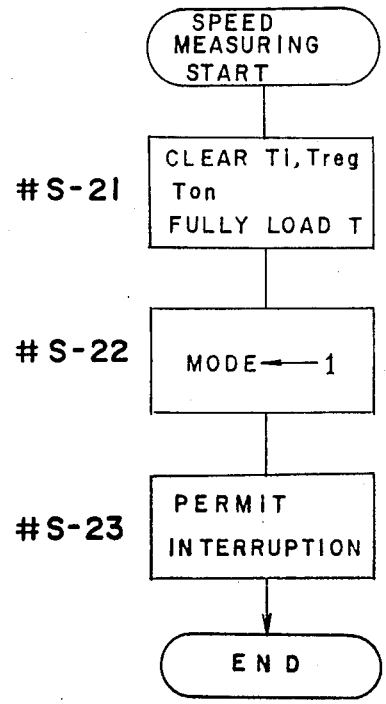

Referring to FIG. 6c, yet another sub-routine for effecting the speed measuring procedure is shown. In the step #S-21, the timer Ton is set to zero, and the switching circuit 7 is held off. Then, in the step #S-22, "1" is set up in the flag MODE, and, in the step #S-23, insertions are permitted. In this case, since the motor is held in the off state during the timer interruption routine INT-T, only the renewal of the timer Ti is carried out at the step T-5. On the other hand, during the external interruption routine INT-E, the timer Ton is made to zero at the step #E-2, and at the step #E-3, it is discriminated whether the present scanning speed is faster than the required speed, or not. If it is discriminated as "YES", that is when the pulse spacing Ti between two consecutive pulses from the encoder 3 is not greater than the required pulse spacing Ts, the program advances to the step #E-7, skipping the step #E-6. Thus, the motor is maintained in the off state. Contrary, if it is discriminated as "NO", that is when the pulse spacing Ti is greater than Ts, the program goes to the step #E-4, wherein the timer Ton is loaded with a time information obtained by way of the equation F(Ti, Ts). Then, since the flag MODE is carrying "1", as mentioned above, the program advances to the step #E-7. At this step, the timer Ton holds a value other than zero, for the first time. At the step #21 of the main routine, it is detected when the timer Ton carries a value other than zero, and, therefore, it can be detected that the scanning speed is close to the speed Vret or it is below that speed.

In the main routine, it is detected that the scanning speed has dropped to the speed Vret in the above described manner, and thereafter, the switching circuit 7 is set to the reverse mode in the step #22. Then in the step #23, a constant speed control procedure is carried out for returning the scanning arrangement towards the home position at the constant speed Vret.

According to the system described above, the control is carried out in such a manner that the reverse mode is first set, and secondly constant speed control procedure is carried out. The reason for taking such an operation is explained below.

In the interruption routine, only the turn on and off of the motor is controlled under the constant speed control. But during braking the scanning arrangement, the switching circuit 7 receives to its input lines L1 and L2, LOW and HIGH, respectively. Since the line L2 is receiving HIGH, the mode of the switching circuit 7 is forward mode. The constant speed control, which takes place after the braking, is effected with the switching circuit 7 in the reverse mode, i.e., when the line L2 carries LOW. Since the control direction is opposite, the switching circuit is in the brake mode position, i.e., in the forward mode until the scanning arrangement slows down to Vret and, thereafter, it is in reverse mode.

After the constant speed control takes place, it is discriminated whether the home switch 4 is turned on or not in the step #24 of the main routine. When the home switch 4 turns on, the stop operation effected by the subroutine of FIG. 6b, is carried out in the step #25, and, thereafter, the program returns to the step #9, ready for starting the next scanning operation.

It is to be noted that, according to the above described embodiment, the moment when the scanning arrangement starts to brake is the moment when the scanning arrangement turns on the brake switch 5. This method is simple and can be accomplished with a few constructing parts. However, the constant speed control period becomes long as the scanning distance becomes short. Therefore, a suitable timer may be provided that operates relatively to the scanning distance and scanning speed, such that the timer starts to count a predetermined time from the start of return operation and, when it has counted a predetermined time, the arrangement may enter into a brake mode. In this case, by making the timer to count a long period of time, it is possible to make the constant speed control shorter, thereby shortening the whole scanning operation.

It is also to be noted that instead of the regeneration current, the brake mode can be controlled by a motor driving current fed in the opposite direction to brake the scanning arrangement with a high braking force or can be controlled by both regeneration current and driving current applied alternately.

Next, the control system for controlling the reciprocation of a scanning arrangement according to the second embodiment is described. Since the control system according to the second embodiment employs a scanning arrangement 1 of FIG. 1, a control system of FIG. 2 and a switching circuit 7 of FIG. 3, a detail description therefor is omitted.

Figure 8:
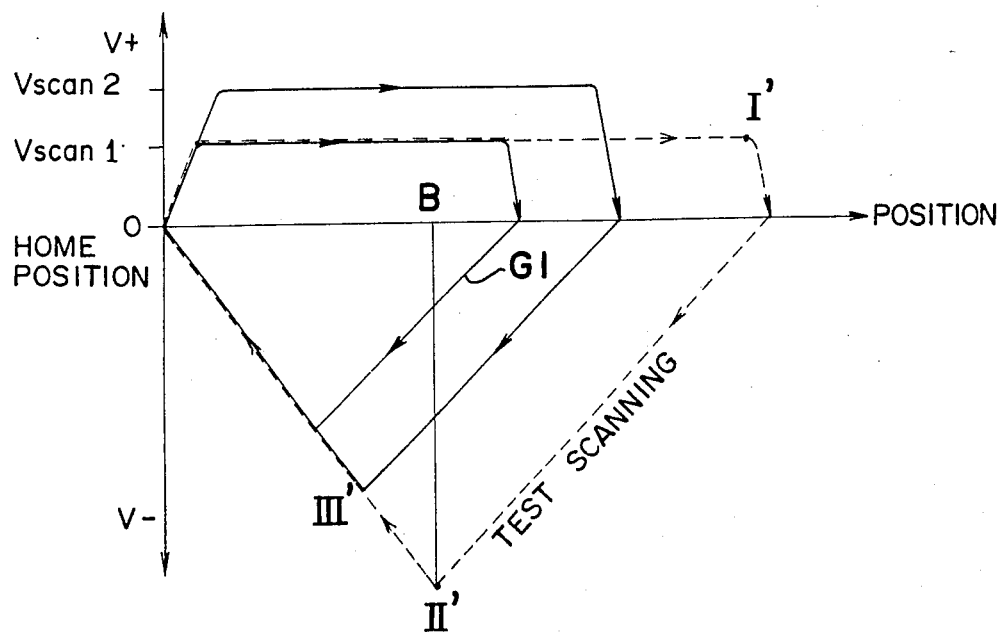
FIG. 8 is a graph showing a pattern of movement of a scanning arrangement according to the second embodiment of the present invention.

Referring to FIG. 8, a graph similar to FIG. 4 is shown. According to the second embodiment, the scanning arrangement first makes a test scan before carrying out the scans for the copying operations.

As indicated by a broken line in FIG. 4, the test scan is carried out in the following steps. Starting from the home position, the scanning arrangement is accelerated up to a speed, e.g., $Vscan_1$, within the pre-running distance and, thereafter, it is moved at the constant speed $Vscan_1$ for the maximum available distance which the scanning arrangement can scan. Then, at a point I', the scanning arrangement is forced to return back, and the returning force is given constantly until the scanning arrangement is moved to the position B, where the brake switch is located, i.e., until a point II'. Thereafter, a braking effect is given to the scanning arrangement to gently stop the scanning arrangement at the home position.

Figure 9:
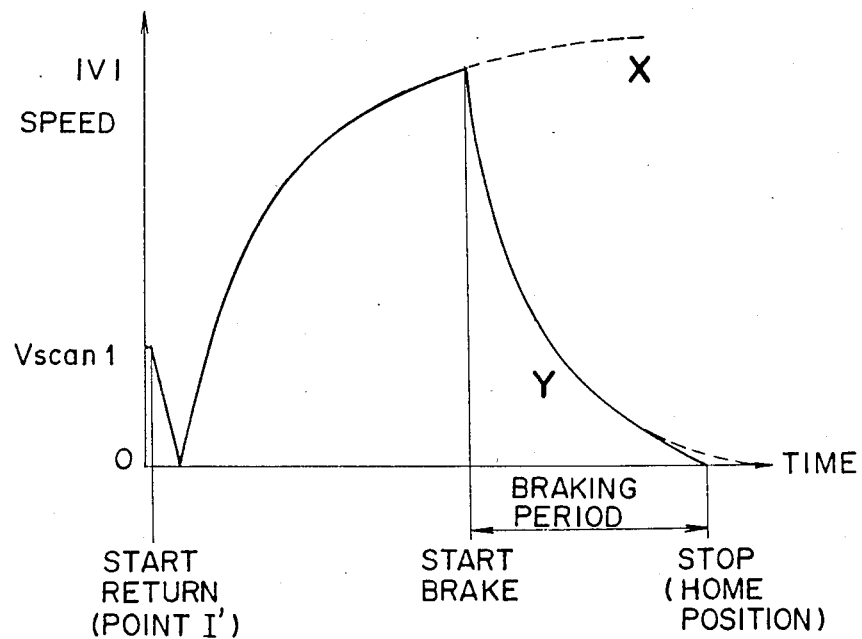
FIG. 9 is a graph showing a speed change of a scanning arrangement during the return movement, according to the second embodiment.

The change of speed of the scanning arrangement with respect to time from the point I' to the home position is shown in a graph of FIG. 9. At a moment when the switching circuit 7 is turned to the reverse drive mode, i.e., at the point I', the scanning arrangement, which has been forwardly moving at the constant speed $Vscan_1$, receives force in the opposite direction towards the home position. Thus, the speed of the scanning arrangement is reduced to zero and, thereafter, the scanning arrangement is accelerated towards the home position. If there is no change in the power source PS and the load, the degree of acceleration becomes small relative to the increase of motor speed because of the counter electromotive force produced by the rotation of the motor. Therefore, the speed of the scanning arrangement does not increase linearly, but increases along a curve as shown. The switching circuit changes its mode from the reverse drive mode to the brake mode when the scanning arrangement hits the brake switch. If the reverse drive mode should continue, the speed of the scanning arrangement increases along a broken line X and saturates. During the brake mode, the power from the power source PS is cut, and the motor is so connected as to brake itself by the counter electromotive force producing regeneration current. In this case, since the counter electromotive force is relative to the motor speed, the motor speed is asymptotically reduced to zero, as indicated by a broken line Y in FIG. 9. However, because there is a frictional force effecting on the scanning arrangement, the scanning arrangement slows down linerally when its speed is low, as indicated by a solid line. The position of the brake switch is adjusted in advance to its positioning so as to stop the scanning arrangement exactly at a home position in the brake mode after hitting the brake switch. According to the preferred embodiment, a suitable damper is provided at the home position to stop the scanning arrangement exactly on the spot.

During the test scanning the micro-computer 8 records information of speed and position during the brake mode, i.e., during when the scanning arrangement is moving from the point II' to the home position.

Then, when carrying out the scans for the copying operations, for example, along a solid line G1 shown in FIG. 8, it is so programmed that each copying operation follows the braking operation in conformity with the braking operation effected in the test scanning, thereby stopping the scanning arrangement fast but gently at the home position. The manner in which the test scan and the copying scan are controlled and carried out are described below with reference to the flow chart shown in FIGS. 10a, 10b, 11a and 11b.

Figure 10A:
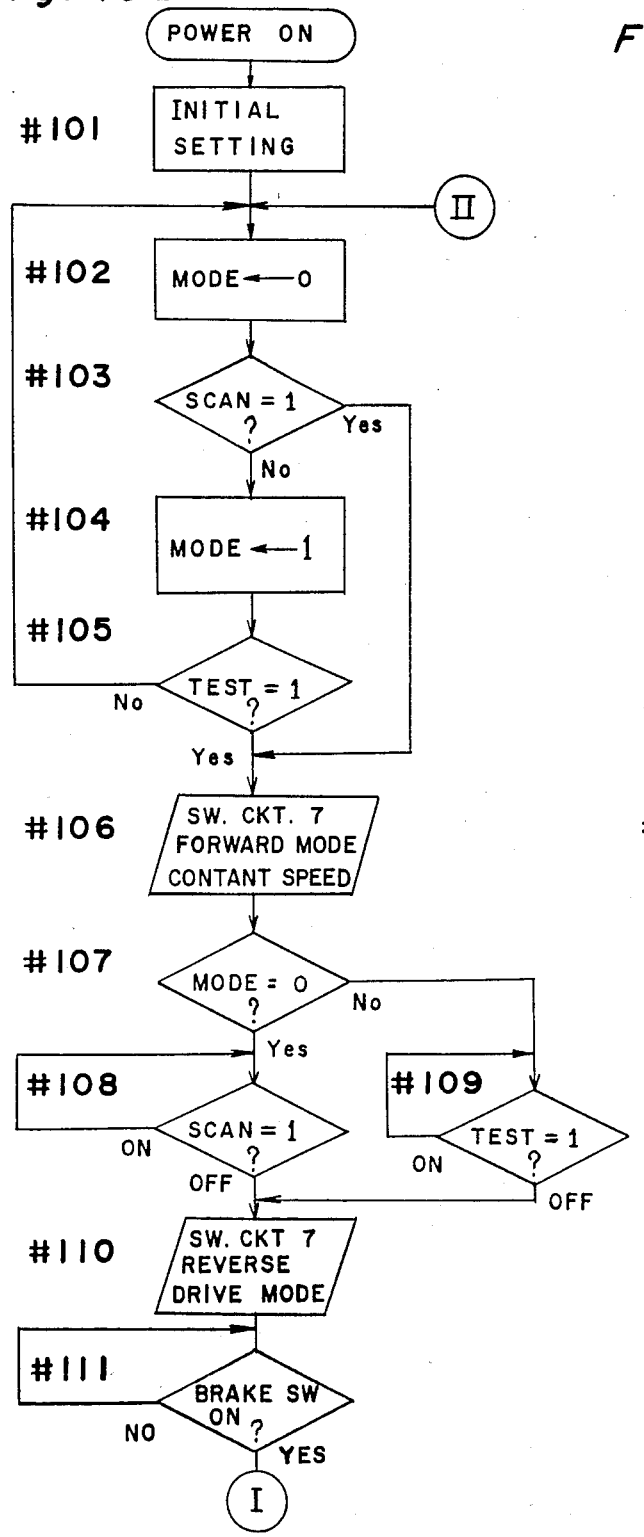
FIGS. 10a and 10b are flow charts of a main routine according to the second embodiment of the present invention.
Figure 10B:
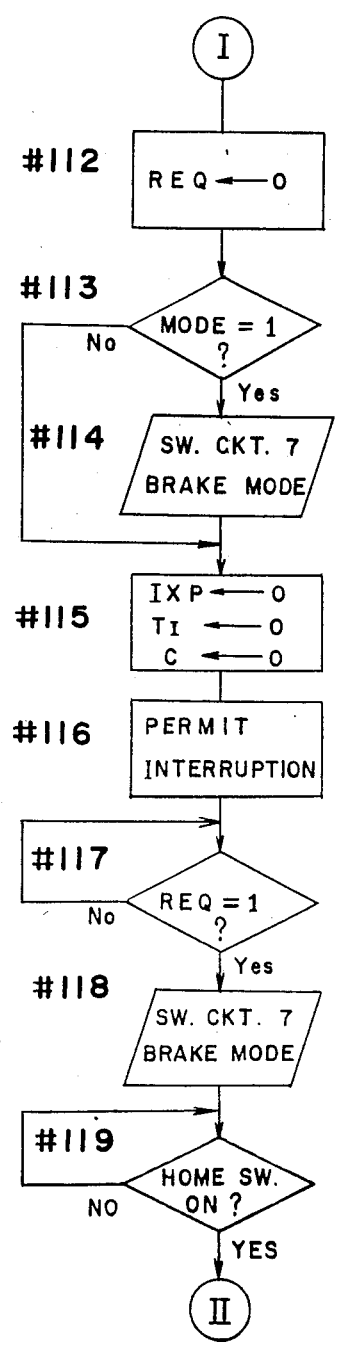

Referring to FIGS. 10a and 10b, when a main switch (not shown) is turned on to provide a power, various parameters in the micro-computer 8 are set to their initial values at the step #101. Then, the micro-computer 8 waits to receive a TEST signal or a SCAN signal from the master computer MM. According to the second embodiment, when the micro-computer 8 receives the SCAN signal a copying operation is carried out in a synchronized relation to the other copying operations. Contrary, when the micro-computer 8 receives the TEST signal a test scan for recording position and speed information during the brake mode is carried out.

When the micro-computer 8 receives a SCAN signal, a MODE flag is set to "0" at the step #102, and at the step #103, it is discriminated that the received signal is a SCAN signal and, therefore, the program advances to the step #106. At this point, the MODE flag is carrying "0". Contrary, when the micro-computer 8 receives a TEST signal, the MODE signal is temporarily set to "0" at the step #102, and at the step #103, it is discriminated that the received signal is not a SCAN signal and, therefore, the program advance to the step #104, wherein the MODE flag is set to "1". Then, at the step #105, it is discriminated that the received signal is a TEST signal and, therefore, the program advance to the step #106. At this point, in this case, the MODE flag is carrying "1". As understood from the above, the MODE flag "0" indicates that the required scan of operation is an ordinary scan for effecting the copying operation, and the MODE flag "1" indicates that the required scan of operation is a test scan for effecting the data storing.

At the step #106, the switching circuit 7 is set to the forward mode in both cases (MODE flag "0" and MODE flag "1") for effecting the forward scan of the scanning arrangement at the constant speed in the same manner described above in the first embodiment. Then, at the step #107, it is discriminated whether the MODE flag is carrying "0" or not. If not, that means if the MODE flag is carrying "1", the program advances to the step #109, wherein it is discriminated whether the TEST signal is still present or not. As long as the TEST signal is present, that is until the scanning arrangement is scanned to the required distance as measured by a suitable timer or as detected by a suitable switch means, the program stays at the step #109. When the TEST signal disappears, or when it is turned to LOW, the program advances to the step #110.

If it is discriminated as "YES" at the step #107, the program advances to the step #108, wherein it is discriminated whether the SCAN signal is present or not. As long as the SCAN signal is present, that is until the scanning arrangement is scanned to the required distance as measured by a suitable timer or as detected by a suitable switch means, the program stays at the step #108. When the TEST signal disappears, or when it is turned to LOW, the program advances to the step #110.

Then, at the step #110, the switching circuit 7 is changed to the reverse drive mode, effecting the return of the scanning arrangement with the incessant power supply.

From hereon, the description is particularly directed to the control of the scanning arrangement under the test scan. The description on the control of the scanning arrangement under the normal scan will be given afterwards.

Under the test scan operation, the scanning arrangement increases its speed in the reverse direction until it actuates the brake switch 5 at the point II" shown in FIG. 8. When the brake switch 5 is actuated, the program advances from the step #111 to step #112, thereby effecting a REQ flag to hold "0". The REQ flag is provided for the linkage between the main routine shown in FIGS. 10a and 10b and the interruption routine shown in FIG. 11a. As will become apparent from the description below, the REQ flag will carry "1" at a moment when it is necessary to start braking the scanning arrangement. Under the test scan, the brake switch 5 has an effect to start braking the scanning arrangement. Furthermore, under the test scan, it is discriminated, at the step #113, that the MODE flag is carrying "1", that is the mode is the test scan mode. At the step #114, the switching circuit 7 is changed to the brake mode, and at the step #115, each of index pointer IXP, register Ti, and counter C provided in the micro-computer 8 is set with "0". The index pointer IXP is provided for pointing or signifying an address of a RAM provided in the micro-computer 8. According to the preferred embodiment, the counter C is an 8-bit counter capable of counting up to 256 clock pulses, and it starts to count immediately after it is set to "0" at the step #115. Then, in the step #116, it is permitted to carry out the interruption routines INT-E and INT-T shown in FIG. 11a and 11b. The interruption routine INT-E is effected in response to each pulse produced from the encoder 3, and the interruption routine INT-T is effected when the counter C has counted up to its maximum, i.e., up to 256. Under the test scan, the interruption routines INT-E and INT-T are provided to memorize the information of position and speed of the scanning arrangement during its movement between the point II" and home position shown in FIG. 8.

When the counter C has counted 256 clock pulses from the step #115, i.e., when 1.28 ms (Since clock pulse has a frequency of 200 KHz, counting 256 clock pulses will take 1.28 ms.) have passed from the step #115, the interruption routine INT-T shown in FIG. 11b is effected. Therefore, at the step #128, the register Ti, which is now carrying "0" as effected at the step #115, is stored with the sum of what it is now carrying (0) and Cmax (the maximum amount that the counter can carry). Therefore, when the interruption routine INT-T is repeated twice, that means that the register Ti carries 512.

When the encoder 3 produces a pulse for the first time from the step #115, i.e., from the actuation of the brake switch 5, the interruption routine INT-E shown in FIG. 11a is effected as the first round. The first round of the interruption routine INT-E may be effected before or after the first round of the interruption routine INT-T, or may be effected after a number of rounds of the interruption routine INT-T, depending on the timing when of the first pulse generated from the encoder 3. When the program enters the interruption routine INT-E, it is discriminated whether the home switch 4 is on or not, at the step #120. Under the test scan, it is discriminated as "not", because the scanning arrangement is scanned to the farthest position and then, it is returned back from such a farthest position towards the home position. Then, at the step #121, the content of the register Ti and the counter C are added with each other, and the sum thereof is stored in a register Tic. And also, in the step #121, the counter C and the register Ti are set to "0", and immediately thereafter, the counter C starts to count up the clock pulses. As understood from the above, the register Tic is stored with an amount which is equal to the total amount of clock pulses produced from the start of the step #115 until the generation of the first pulse from the encoder 3. Thus, if the counter C has been over flown for n times, the register Tic will be stored with an amount 256×n+C. Then, since the mode is the test scan mode, the MODE flag is carrying "1". Therefore, it is discriminated as "YES" at the step #122, thereby advancing the program to the step #124. In the step #124, the content of the register Tic is stored in the RAM at a location signified by the index pointer IXP, which is now carrying "0" as effected in the step #115. Then, in the step #125, the index pointer IXP is added with "1", thereby increased to "1". Then, the first cycle of the interruption routine INT-E ends, effecting the store of speed information at a position one pitch shifted towards the home position from the brake switch position.

Until the encoder 3 produces a second pulse, the counter C counts up and, when the counter C over flows during the counting, it is reset to "0" and starts to count up again, and, at the same time, the register Ti increases its content by an amount 256 each time the counter C over flows. This operation is carried out by the interruption routine INT-T.

Thereafter, when the encoder 3 produces a second pulse, the steps #120, #121, #122, #124 and #125 are carried out again to store the information of time counted from the end of the first pulse from the encoder 3 until the generation of the second pulse from the encoder 3 in the RAM at a location signified by an address "1", as designated by the index pointer IXP. When, the second cycle of the interruption routine INT-E ends, the store of speed information at a position two pitches shifted towards the home position from the brake switch position is effected.

It is to be noted that the interruption routine INT-E, containing steps #120 to #127, is carried out at an instant when one pulse is generated from the encoder 3. In summary, it can be said that the counter C together with the associated register Ti counts each period between two consecutive pulses from the encoder 3 in a synchronized manner with the pulse generated from the encoder 3. And, the counted periods are sequentially stored in the RAM at locations with a consecutively increasing address number. Since the encoder 3 produces a pulse after a predetermined distance movement of the scanning arrangement, the address number corresponds to the position of the scanning arrangement measured from the position of the brake switch, and the counted time stored in each address corresponds to the speed of the scanning arrangement at the position corresponding to the address.

The above described interruption routines INT-E and INT-T are carried out repeatedly for many times until the scanning arrangement actuates the home switch 4. When the scanning arrangement actuates the home switch 4, the procedure in the interruption routine INT-E advances from the step #120 to the step #126, thereby setting "1" to the REQ flag. And, in the step #127, interruption routine is prohibited.

Back to the main routine shown in FIG. 10b, it is discriminated at the step #117 that the REQ flag is carrying "1". Then, at the step #118, the switching circuit 7 it turned to the brake mode (For the program procedure under the test scan, the step #118 can be skipped, because the switching circuit 7 is already in the brake mode as effected in the step #114.). Then, since the home switch 4 is already on, the program passes through the step #119 and returns back to the step #102, ready for the next cycle of operation, which is generally an operation of copying scan.

Next, the description is directed to the control of the scanning arrangement under the normal scan from the step #110.

Under the normal scan operation, the scanning arrangement increases its speed in the reverse direction, and during the increase of its speed, the scanning arrangement actuates the brake switch 5 at the point II" shown in FIG. 8. Accordingly, the program advances to the step #111 and further to the step #112, in which the REQ flag is loaded with "0". Then, in the step #113, since the operation is the normal scan operation, the MODE flag is carrying "0" and, therefore, the program jumps to the step #115 setting each of index pointer IXP, register Ti, and counter C with "0", and further to the step #116, thereby permitting the interruption routines. Under the normal scan operation, the program advances to the step #116 without passing the step #114. Thus, under the normal scan operation, the switching circuit 7 is still in the reverse drive mode even after the actuation of the brake switch 5, as indicated in solid line in FIG. 8.

The counter C counts up from the step #115, and when it over flows, the register Ti increases its amount by the interruption routine INT-T, in the same manner as carried out during the test scan operation.

When the encoder 3 produces a first pulse from the step #115, i.e., from the actuation of the brake switch 5, the interruption routine INT-E shown in FIG. 11a is effected for the first round. The first round interruption routine INT-E may be effected before or after the first round interruption routine INT-T, or may be effected after a number of rounds of the interruption routine INT-T, depending on the timing when of the first pulse generated from the encoder 3. When the program enters the interruption routine INT-E, it is discriminated whether the home switch 4 is on or not, at the step #120. At this moment, since the home switch is located further away, it is discriminated as "not". Then, at the step #121, the content of the register Ti and the counter C are added with each other, in the same manner as in the test scan mode, and the sum thereof is stored in a register Tic. And also, in the step #121, the counter C and the register Ti are set to "0", and immediately thereafter, the counter C starts to count up the clock pulses again. Then, since the mode is the normal scan mode, the MODE flag is carrying "0". Therefore, it is discriminated as "NO" at the step #122, thereby advancing the program to the step #123. In the step #123, the content of the register Tic, carrying information of present return speed, is compared with the stored information in the RAM at a location signified by the index pointer IXP, which is now carrying "0" as effected in the step #115. At this point, since the return speed is not as fast as the speed stored in the RAM at the location with the address 0, the program advances to the step #125, wherein the index pointer IXP is added with "1", thereby increased to "1". Then, the first cycle of the interruption routine INT-E ends, effected to continuously keep the switching circuit 7 in the reverse drive mode.

Thereafter, when the encoder 3 produces a second pulse, the steps #120, #121, #122, #123 and #125 are carried out again to compare the present speed with the required speed, as stored in the RAM during the test scan.

Such a comparison in the step #123 is carried out a number of times by repeating the interruption routine INT-E. When the present speed becomes equal to or greater than the required speed, as may occur at a point III' shown in FIG. 8, the program advances from the step #123 to the step #126, thereby loading "1" in the REQ flag. Then, in the step #127, the interruption routines are prohibited.

Thereafter, the program returns back to the main routine shown in FIG. 10b, at the step #117, wherein it is discriminated whether the REQ flag is carrying "1". Since the REQ flag is carrying "1", the program advances to the step #118, wherein the switching circuit 7 it turned to the brake mode. In the normal scan operation, since the switching circuit 7 is turned to the brake mode at a particular timing when the returning speed and returned position are in conformity with those obtained under the test mode, the return movement of the scanning arrangement thereafter will be the same as those obtained under the test mode without any control, provided that the switching circuit 7 is powered in the same manner as in the test mode operation. Accordingly, the scanning arrangement is quickly but gently returned back to the home position with less deviation.

In a manner similar to the first embodiment, when one interruption routine, such as INT-E, is requested while the other interruption routine INT-T is taking place, said one interruption routine INT-E takes place immediately after the completion of the the other interruption routine INT-T. Furthermore, when both interruption routines INT-E and INT-T are requested at the same time, the interruption routine INT-T is effected first, and then, the interruption routine INT-E is effected.

According to the second embodiment described above, during the movement of the scanning arrangement from the brake switch position B to the home position, the information of speed and position of the scanning arrangement are sampled discretely with intervals. Such intervals vary greatly particularly when the scanning arrangement accelerates or decelerates greatly. When the intervals vary greatly it is difficult to match the copy scan pattern with the test scan pattern, resulting in error in the copy scan operation. Such an error becomes great as the speed of the scanning arrangement becomes great. In order to reduce such an error, the information of speed and position of the scanning arrangement are sampled at a higher rate.

According to the second embodiment described above, the information of speed and position of a reference pattern under the brake mode is stored by way of test scan effected after the turn on of a main switch, because the RAM, which is a voratile memory, will lose the stored information whenever the main switch is turned off. If the voratile memory means, i.e., RAM, is replaced with a type that continues to hold the information even after the turn off of the main switch, or is provided in association with a back-up system that keeps the memory means to hold the information even after the turn off of the main switch, it is necessary to carry out the test scan for only once.

Furthermore, according to the second embodiment of the present invention, the information of speed and position of a reference pattern under the brake mode is obtained or renewed each time the test scan is carried out. Therefore, the reference pattern can be changed with respect to the change of motor characteristics and other factors which may happen after a long term use of the machine, or when the environmental condition changes. This has an advantage in providing an optimum reference pattern. Furthermore, even when the load changes, the optimum reference pattern can be obtained by carrying out the test scan after the adjustment of the position of the brake switch 5.

In the case where the motor characteristics and other factors change very little or when such factors can be disregarded of, it is possible to provide a fixed reference pattern. In this case, no test scan is needed.

It is to be noted that, in the second embodiment also, the brake mode can be controlled by a motor driving current fed in the opposite direction instead of the regeneration current, to brake the scanning arrangement with a high braking force, or can be controlled by both regeneration current and driving current applied alternately.

Next, the control system for controlling the reciprocation of a scanning arrangement according to the third embodiment is described.

Figure 12:
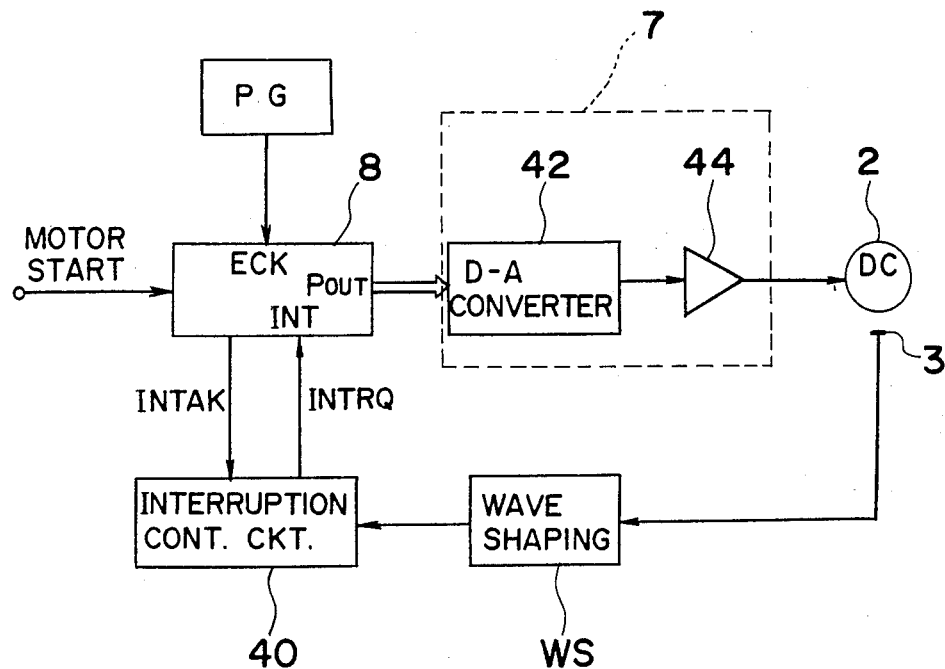
FIG. 12 is a block diagram showing a control system for reciprocation of scanning arrangement according to the third embodiment of the present invention.

Referring to FIG. 12, the control system according to the third embodiment, has the switching circuit 7 provided with D-A converter 42 for converting the digital signal from the micro-computer 8 to analog signal. For example, when the micro-computer 8 is producing from its output Pout an on-off signal with a duty ratio of 70%, the D-A converter 42 converts the on-off signal to a constant level signal having a constant level of 70% of a full level. The switching circuit 7 is also provided with an amplifier 44 for amplifying the level signal produced from the D-A converter 42. In addition, the switching circuit 7 is provided with a circuit (not shown) for controlling the direction of rotation of the D.C. motor 2.

Figure 13:
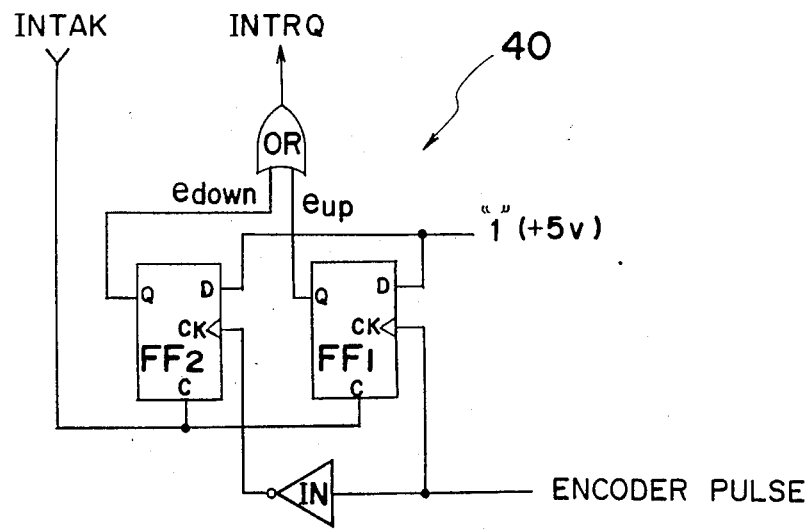
FIG. 13 is a circuit diagram of an interruption control circuit shown in FIG. 12.

The encoder 3, which produces a train of pulses representing the speed of the D.C. motor 2, is connected through the wave shaping circuit WS to an interruption control circuit 40, which is shown in detail in FIG. 13. In response to each of the leading and trailing edges of each encoder pulse, the interruption control circuit 40 is set in such a condition to produces an INTRQ signal, which is applied to the micro-computer 8 to an input INT. The INTRQ signal effects the micro-computer 8 to start the interruption routine. By an INTAK signal from the micro-computer 8, the interruption control circuit is returned to the initial state producing no INTRQ signal.

It is to be noted that the leading edge of the encoder pulse can be either step-up edge or step-down edge. The same can be said to the trailing edge.

Referring to FIG. 13, the interruption control circuit 40 comprises a flip-flop FFI having its clock input CK connected to the wave shaping circuit WS for receiving encoder pulses. The Q terminal of the flip-flop FF1 is connected to one input of an OR gate OR and the clear terminal thereof is connected to the micro-computer to receive the INTAK signal. The interruption control circuit 40 further comprises another flip-flop FF2 having its clock input CK connected to the wave shaping circuit WS through an inverter IN for receiving encoder pulses. The Q terminal of the flip-flop FF2 is connected to the other input of the OR gate OR and the clear terminal thereof is connected to the micro-computer to receive the INTAK signal. The output of the OR gate OR is connected to the terminal INT of the micro-computer 8.

In response to the leading edge of the encoder pulse, the flip-flop FF1 produces "HIGH" which is produced out from the OR gate OR as the INTRQ signal. Then, when the micro-computer 8 produces the INTAK signal, the flip-flop FF1 is turned to the reset condition, whereby the flip-flop FF1 produces "LOW" from its Q terminal to stop producing the INTRQ signal.

Similarly, in response to the trailing edge of the encoder pulse, the flip-flop FF2 produces "HIGH" which is produced out from the OR gate OR as the INTRQ signal. Then, when the micro-computer 8 produces the INTAK signal, the flip-flop FF2 is turned to the reset condition, whereby the flip-flop FF2 produces "LOW" from its Q terminal to stop producing the INTRQ signal.

Figure 17:
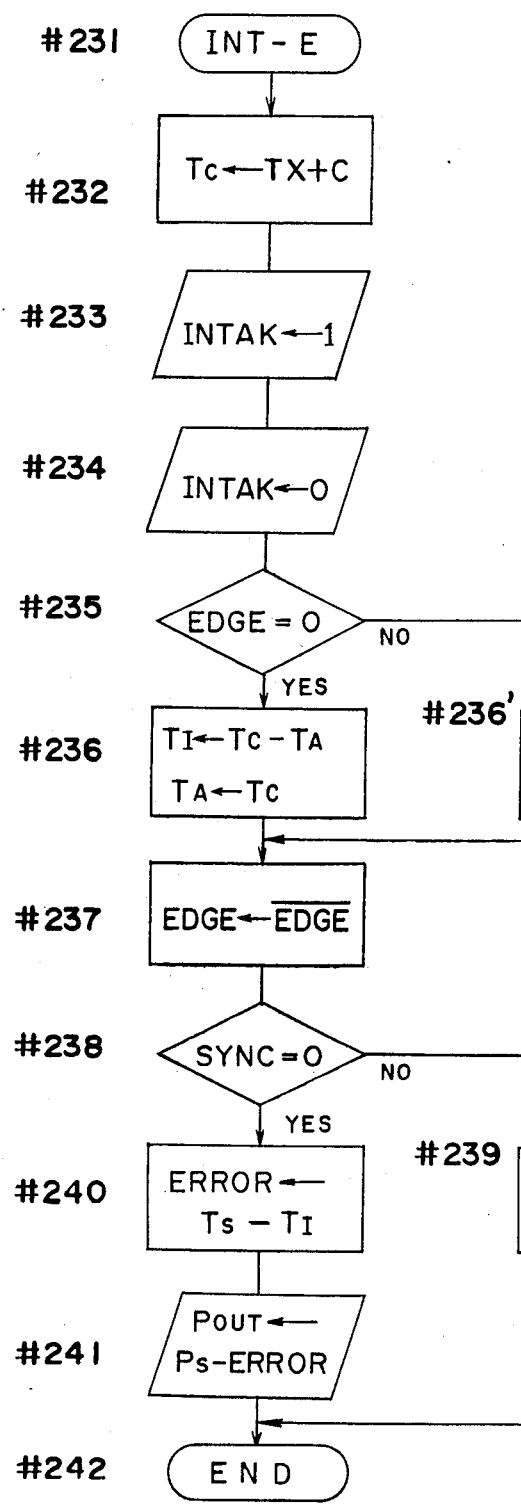
FIGS. 16 and 17 show interruption routines according to the third embodiment of the present invention.

When the micro-computer 8 receives an INTRQ signal from the interruption control circuit 40 in response to both of the leading and trailing edges of the encoder pulse, the micro-computer 8 starts to carry out the interruption routine INT-E shown in FIG. 17. And, when the micro-computer 8 is producing the INTAK, the flip-flops FF1 and FF2 are maintained in the reset condition, causing no generation of INTRQ signal regardless of encoder pulse applied to the interruption control circuit 40.

According to the third embodiment, the micro-computer 8 is provided with following elements:

Timer TX: A timer which continuously counts up the time, e.g., from the moment when the main switch is turned on until it is turned off.

Register TC: A register provided for storing a time of the timer TX each time when the interruption routine INT-E is effected.

Register TA: A register provided for storing a time of the timer TX when the leading edge of the encoder pulse appears.

Register TB: A register provided for storing a time of the timer TX when the trailing edge of the encoder pulse appears.

Register TI: A register provided for storing a period of time between two consecutive leading, or trailing, edges of the encoder pulses.

Register SYNC: A register provided for counting two interruption routines from the beginning of the operation so that the two first interruption routines can be used for the preparation of control operation.

EDGE flag: A flag that carries "0" or "1" to identify the pulse edge whether it is a trailing edge or a leading edge.

Register ERROR: A register provided for storing a difference between the present speed data and the required speed data.

Figure 14:
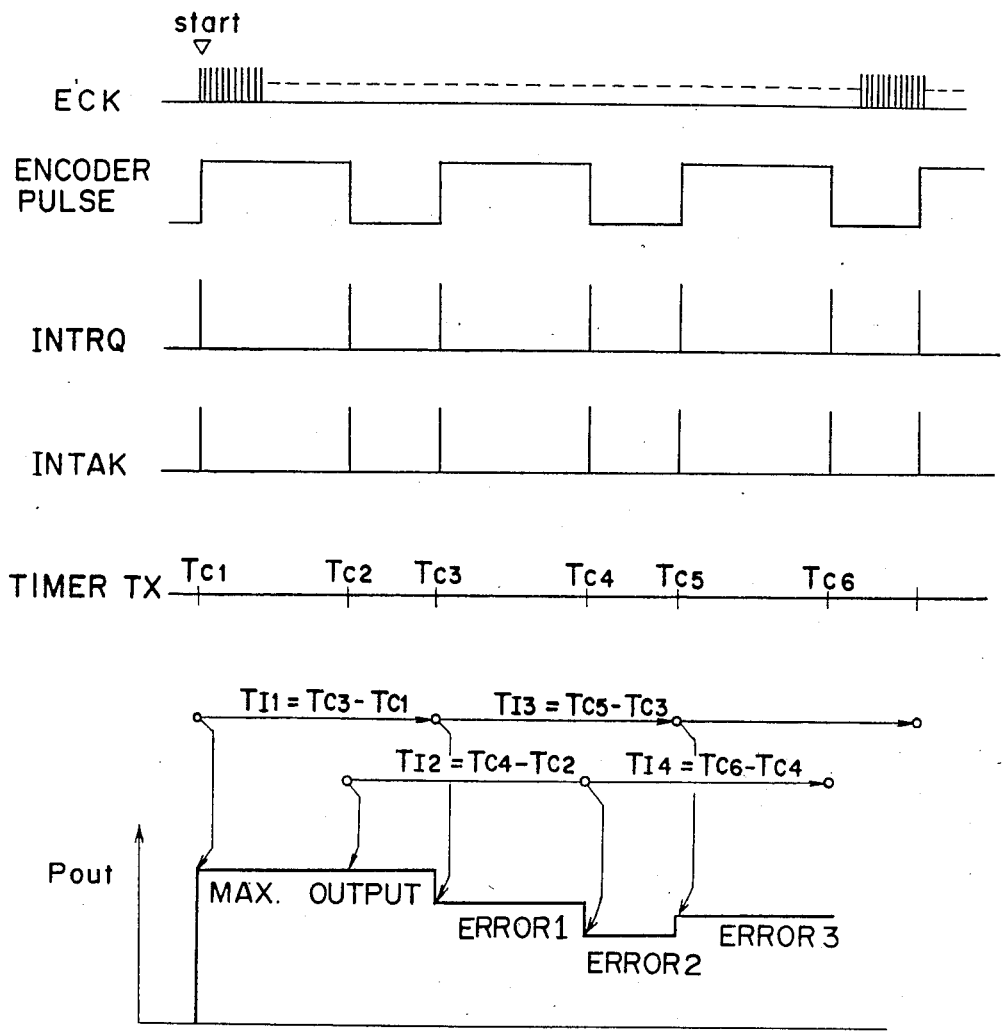
FIG. 14 is a time chart showing a fundamental system operation according to the third embodiment of the present invention.

Referring to FIG. 14, there is shown a time chart showing a fundamental system operation according to the third embodiment. When the micro-computer 8 receives a START signal or SCAN signal from the master computer MM at a moment when the timer T has counted up to Tc1 (hereinafter merely stated as at a moment Tc1), The micro-computer 8 produces a maximum output from the Pout to drive the motor 2 with the maximum power. If the encoder 3 happens to produce a first encoder pulse at the moment Tc1 as shown, the interruption control circuit 40 produces the INTRQ signal at the moment Tc1 and, at the same time, the time Tc1 is stored in the register TA. Then, when the first encoder pulse ends at a moment Tc2, the interruption control circuit 40 produces the INTRQ signal, thereby storing the time Tc2 in the register TB.

Then, when the second encoder pulse is produced at a moment Tc3, a calculation Tc3-Tc1=TI1 is carried out using data from the register TC and register TA, and the calculated difference TI1 is stored in the register TI. Immediately thereafter, the data stored in the register TA is changed from Tc1 to Tc3. Since the second encoder pulse is produces after a predetermined distance movement of the scanning arrangement from moment Tc1, the difference TI1 is in relation to the speed of the scanning arrangement. The micro-computer 8 is previously taught or stored with the data of required speed. Such data of required speed is compared with the difference TI1 representing the present speed and the difference therebetween is stored in the register ERROR for the correction of the scanning speed. For example, if the present speed calculated from the difference TI1 is slower than the required speed, the micro-computer 8 continues to produce the maximum output. Contrary, if the present speed is faster than the required speed, the micro-computer 8 produces an intermediated level, as shown in FIG. 14, corrected by an ERROR1 data stored in the register ERROR.

Then, when the second encoder pulse ends at a moment Tc4, the interruption control circuit 40 produces the INTRQ signal. In this case, a calculation Tc4-Tc2=TI2 is carried out using data from the register TC and register TB. The calculated difference TI2 is stored in the register TI. Immediately thereafter, the data stored in the register TB is changed from Tc2 to Tc4. The difference TI2 representing the present speed of the scanning arrangement is compared with the data presenting the required speed, and the register ERROR, after having erased the previous data ERROR1, stores the difference therebetween as a new data ERROR2. In this manner, the information of speed and position can be sampled at twice as many times as that effected in the previous embodiments. The control system of the third embodiment is further described in detail with reference to the flow charts shown in FIGS. 15, 16 and 17.

Figure 15:
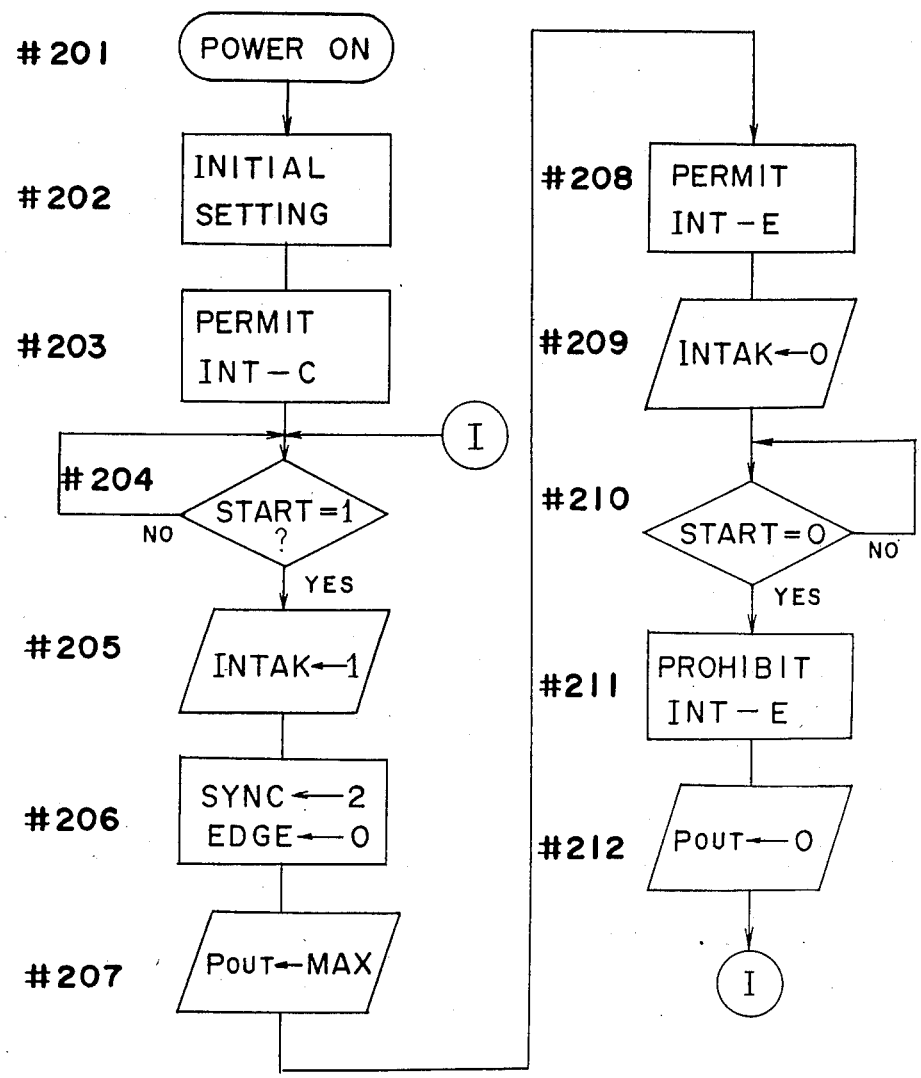
FIG. 15 is a flow chart of a main routine according to the third embodiment of the present invention.
Figure 16:
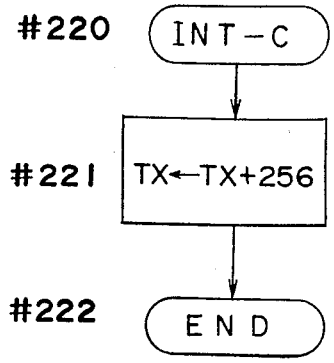

Referring to FIG. 15 showing the main routine, the main switch is turned on at the step #201, and the initial setting is effected at the step #202, whereby the timer TX starts to count up the time after the step #202. Then, the interruption routine INT-C is permitted at the step #203, so as to count time in a similar manner described above in the previous embodiment using the interruption routine INT-C. Then, in the step #204, the micro-computer 8 waits until it receives a START signal from the master computer MM. When the micro-computer 8 receives a START signal, it produces INTAK signal at the step #205 to reset the interruption control circuit 40. And at the step #206, the register SYNC is stored with "2" and the EDGE flag carries "0", enabling the discrimination of the type of edge.

Since the register SYNC is loaded with "2", at the step #206, the error calculation of the speed will be carried out after counting "2" of each of leading and trailing edges. That is, no speed measuring, effected at each of the leading and trailing edges, is held for the first 2 edges, but instead, produces maximum amount from an output Pout, as carried out in the next step #207. At the step #207, the micro-computer 8 produces a digital signal representing the maximum amount. This is done, for example, by storing the register ERROR with the maximum available amount. Thus, the motor 2 starts to run with a full driving power. Then, at the step #208, the interruption routine INT-E is permitted, and at the step #209, the INTAK signal is removed or turned to "0" for releasing the interruption control circuit 40 from the reset condition. In the main routine, it is checked whether the START signal is present or not. During the presence of the START signal, the scanning arrangement carries out one cycle of scan controlled by the interruption routine INT-E repeatedly effected at a high sampling rate.

When the motor 2 starts to run, the encoder 3 produces a train of pulses. Then, in response to the leading edge (this can be either step-up or step-down) of the first encoder pulse, the interruption control circuit 40 produces an INTRQ signal, thereby starting the interruption routine INT-E shown in FIG. 17. At the step #232, the register TC is stored with a data, such as Tc1 shown in FIG. 14, representing the present time. Then, at the step #233, the INTAK signal carrying "1" is produced so as to reset the interruption control circuit 40, and at the step #234, the INTAK signal is returned to "0" so as to be ready for the next pulse edge. At the next step #235, it is discriminated whether the EDGE flag is carrying "0" or "1", i.e., whether the detected edge is the leading edge (EDGE=0) or the trailing edge (EDGE=1). Since the EDGE flag is carrying "0" as set up in the step #206, the program advances to the step #236. Since interruption routine now carrying out is the first one, the register TA is carrying "0" and, therefore, the register TI is stored with a suitable amount and, immediately thereafter, the register TA is stored with the data Tc1 representing the present time as carried in the register TC. Then, in the step #237, the state of the EDGE flag is turned to the opposite state. For example, when the EDGE flag is carrying "0" as in the above given example, the EDGE flag starts to carry "1" from the step #237.

Then, in the next step #238, it is discriminated whether the register SYNC is carrying "0" or not. Since the register SYNC is now carrying "2" as set in the step #206, the program advances to the step #239, in which the content of the register SYNC is subtracted by "1", and completes the first cycle of interruption routine INT-E without carrying out the correction steps #240 and #241, which will be described later.

Then, when the trailing edge of the first encoder pulse comes, the interruption control circuit 40 produces an INTRQ signal, thereby starting the interruption routine INT-E for the second time. At the step #232, the register TC is stored with a data, such as Tc2 shown in FIG. 14, representing the present time. Then, at the step #233, the INTAK signal is turned to "1", and at the step #234, it is returned to "0", in the same manner described above. At the next step #235, it is discriminated that the EDGE flag is carrying "1" representing the trailing edge. Therefore, the program advances to the step #236'. Since interruption routine now carrying out is the second one, the register TB is carrying "0" and, therefore, the register TI is stored with a suitable amount and, immediately thereafter, the register TB is stored with the data Tc2 representing the present time as carried in the register TC. Then, in the step #237, the EDGE flag, which has been carrying "1", starts to carry "0".

Then, in the next step #238, since the register SYNC is carrying "1" the program again advances to the step #239, and thus completing the second cycle of interruption routine INT-E without carrying out the correction steps #240 and #241.

Then, when the leading edge of the second encoder pulse comes, the interruption control circuit 40 produces an INTRQ signal, thereby starting the interruption routine INT-E for the third time. At the step #232, the register TC is stored with a data, such as Tc3 shown in FIG. 14, representing the present time. Then, at the step #233, the INTAK signal is turned to "1", and at the step #234, it is returned to "0", in the same manner described above. At the next step #235, it is discriminated that the EDGE flag is carrying "0" representing the leading edge. Therefore, the program advances to the step #236. In the third interruption routine, the register TA is carrying Tc1 and, therefore, the register TI is stored with a difference Tc3-Tc1, which is substantially equal to a time interval between the leading edge of the first encoder pulse and the leading edge of the second encoder pulse. Immediately thereafter, the register TA is stored with the data Tc3 representing the present time as carried in the register TC. Then, in the step #237, the EDGE flag, which has been carrying "0", starts to carry "1".

Then, in the next step #238, since the register SYNC is carrying "0" the program advances to the step #240, wherein a difference between the preferred time interval Ts and the actual time interval TI is calculated, and the calculated difference is stored in the register ERROR. In the next step #241, the calculated difference as stored in the register ERROR is used for correcting the output signal from the micro-computer 8 through a calculation Ps-ERROR, wherein Ps is the preferred output level, such as a level corresponding to an average electric power during the constant speed. Then, the third cycle of interruption routine INT-E completes.

Then, when the trailing edge of the second encoder pulse comes, the interruption control circuit 40 produces an INTRQ signal, thereby starting the interruption routine INT-E for the fourth time. At the step #232, the register TC is stored with a data, such as Tc4 shown in FIG. 14, representing the present time. Then, at the step #233, the INTAK signal is turned to "1", and at the step #234, it is returned to "0", in the same manner described above. At the next step #235, it is discriminated that the EDGE flag is carrying "1" representing the trailing edge. Therefore, the program advances to the step #236'. In the fourth interruption routine, the register TB is carrying Tc2 and, therefore, the register TI is stored with a difference Tc3=4-Tc2, which is substantially equal to a time interval between the trailing edge of the first encoder pulse and the trailing edge of the second encoder pulse. Immediately thereafter, the register TB is stored with the data Tc4 representing the present time as carried in the register TC. Then, in the step #237, the EDGE flag, which has been carrying "1", starts to carry "0".

Then, in the next step #238, since the register SYNC is carrying "0" the program advances to the step #240, wherein a difference between the preferred time interval Ts and the actual time interval TI is calculated, and the calculated difference is stored in the register ERROR for correcting, in the same manner described above, the output signal from the micro-computer 8. Then, the fourth cycle of interruption routine INT-E completes.

In the above described manner, the interruption routine INT-E is carried out repeatedly with a sampling rate which is twice as many as the frequency of the encoder pulses. Accordingly, a precise control can be carried out.

According to the third embodiment, it is not necessary to render the duty ratio of the encoder pulses 50%, but can be any other ratio. However, from the view point of impartial control, the duty ration should preferably be about 50%.

The third embodiment has the advantage of a high degree of accuracy for controlling the reciprocation of the scanning arrangement. Therefore, when the third embodiment is adapted in the system of the first or second embodiment, the scanning arrangement moves with a high stability and returns back to the home position with the least deviation.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A system for controlling the reciprocation of a scanning apparatus comprising:
   scanning means for scanning an original, said scanning means adapted to scan from a home position across said original to a scanned position and returning it from the scanned position through an intermediate position to the home position;
   a D.C. motor for driving said scanning means;
   switching circuit means for providing electric power to said D.C. motor;
   home position detecting means for detecting the scanning means when it is in said home position;
   speed detecting means for detecting the moving speed of the scanning means; and
   control means coupled to said switching circuit means for controlling the speed of the scanning means such that: said scanning means scans across said original at a predetermined constant speed; when it reaches said scanned position, said scanning means starts to return back towards said home position through application by said switching circuit means of a constant supply of power having a predetermined level to accelerate said scanning means; when it is returned back to said predetermined intermediate position, said scanning means is braked until the returning speed is reduced to a predetermined low speed as detected by said speed detecting means; said scanning means is returned at said low constant speed back to said home position; and said scanning means is stopped at said home position.

2. A system as claimed in claim 1, further comprising intermediate position detecting means for detecting the scanning means when it is returned to said predetermined intermediate position.

3. A system as claimed in claim 1, wherein said control means controls the scanning means to scan at said constant speed and return at said constant slow speed by the detection of present speed of said scanning means by said speed detecting means, and comparing said present speed with a required speed stored in said control means, said constant speed movement being accomplished by the intermittent power supply to said D.C. motor with the control of duty cycle ratio.

4. A system as claimed in claim 1, wherein said control means brakes said scanning means by means of regeneration braking.

5. A system for controlling the reciprocation of a scanning apparatus comprising:
scanning means for scanning an original, said scanning means adapted to scan from a home position across said original to a scanned position and returning it from the scanned position back through an intermediate position to the home position;
a D.C. motor for driving said scanning means;
switching circuit means for providing electric power to said D.C. motor;
speed detecting means for detecting the moving speed of the scanning means;
position detecting means for detecting the position of the scanning means;
control means coupled to said switching circuit means for controlling the speed of the scanning means such that: said scanning means scans across said original at a predetermined constant speed; when it reaches said scanned position, said scanning means starts to return back towards said home position by application of a constant supply of power having a predetermined level; and when it is returned back to said intermediate position, said scanning means is braked until the returning speed is reduced to zero, thereby returning said scanning means to said home position; and
determining means for determining said intermediate position, said determining means comprising memory means for storing a reference pattern of speed and position of said scanning means as it is returned under braking to bring the scanning means substantially to said home position when the scanning means finally stops by the effect of the brake, said determining means comparing the present speed and position of said scanning means as obtained by said speed detecting means and position detecting means with the stored speed and position of the reference pattern, and when the former becomes substantially equal to the latter, said determining means producing a signal indicating that the scanning means has returned to said intermediate position.

6. A system as claimed in claim 5, wherein said reference pattern is measured and stored by a test scan operation.

7. A system as claimed in claim 6, further comprising switch means disposed in a path of said scanning means, said switch means provided, under the test scan operation, for producing a signal indicating the intermediate position so as to store the reference pattern of speed and position during the movement of said scanning means between said switch means and said home position, and, under the ordinary scan operation, for producing a signal that starts comparison of the present speed and position of said scanning means as obtained by said speed detecting means and position detecting means with the stored speed and position of the reference pattern.

8. A system as claimed in claim 6, wherein said memory means is a volatile memory, and said test scan operation is carried out at least each time a main power switch is turned on.

9. A system as claimed in claim 5, wherein said control means controls the scanning means to scan at said constant speed by the detection of present speed of said scanning means by said speed detecting means, and comparing said present speed with a required speed stored in said control means, said constant speed movement being accomplished by the application of intermittent power to said D.C. motor by said switching circuit means with the control of duty cycle ratio.

10. A system as claimed in claim 5, wherein said control means brakes said scanning means by means of regeneration braking.

11. A system for controlling the reciprocation of a scanning apparatus comprising:
scanning means for scanning an original, said scanning means adapted to scan from a home position across said original to a scanned position and returning it from the scanned position back to the home position;
a D.C. motor for driving said scanning means;
a switching circuit for providing electric power to said D.C. motor;
pulse generating means for generating a train of pulses having a frequency in relation to the speed of the scanning means;
first period detecting means for detecting a time interval between a trailing edge of one pulse and a trailing edge of a next pulse;
second period detecting means for detecting a time interval between a leading edge of one pulse and a leading edge of a next pulse; and
control means coupled to said switching circuit for controlling the speed of the scanning means based on the detected time interval by said first and second period detecting means.

12. A system as claimed in claim 11, wherein said pulses have a duty ratio of about 50%.

13. A system for controlling the reciprocation of a scanning apparatus comprising:
scanning means for scanning an original, said scanning means adapted to scan from a home position across said original to a fully scanned position and return from the fully scanned position back through an intermediate position to the home position;
drive means for driving and braking said scanning means;
home position detecting means for detecting said scanning means in the home position;

speed detecting means for detecting the speed of said scanning means; and control means for controlling said drive means such that said scanning means is driven across said original and when it reaches said fully scanned position said scanning means is accelerated back towards said home position until it reaches said intermediate position at which time said scanning means is braked until the returning speed is reduced to a predetermined speed as detected by said speed detecting means with said scanning means being driven at said predetermined speed until it reaches said home position where it is stopped.

14. The system of claim 13 wherein said drive means includes a D.C. motor and a switching circuit means for providing electric power to said motor in response to said control means.

15. The system of claim 14 further comprising intermediate position detecting means for detecting when said scanning means is at said intermediate position.

16. The system of claim 14 wherein said control means includes memory means for storing required speed data and comparing means for comparing said required speed data and the present speed of said scanning means as detected by said speed detecting means, and said control means controls said drive means in response to the comparison.

17. The system of claim 14 wherein said drive means brakes said scanning means by way of regeneration braking.

18. A system for controlling the reciprocation of a scanning apparatus comprising:

scanning means for scanning an original, said scanning means adapted to scan from a home position across said original to a fully scanned position and return from the fully scanned position back through an intermediate position to the home position;

drive means for driving and braking said scanning means;

speed detecting means for detecting the speed of said scanning means;

position detecting means for detecting the position of said scanning means at either said fully scanned position, said intermediate position or said home position;

control means for controlling said drive means such that said scanning means scans across said original and when it reaches said fully scanned position said scanning means is accelerated back towards said home position and when said scanning means is returned back to said intermediate position as determined by said position detecting means, said scanning means is braked until it is stopped at said home position; and said control means including a determining means having memory means for storing a reference pattern of speed and position of said scanning means as it is returned under braking to bring the scanning means substantially to said home position when the scanning means finally stops by the effect of the braking action, comparison means for comparing the present speed and position of said scanning means as obtained by said speed detecting means and said position detecting means with the stored speed and position of the reference pattern and providing said control means with a signal indicating that said scanning means is at said intermediate position in response to the comparison.

19. The system of claim 18 wherein said drive means includes a D.C. motor and a switching circuit means for providing electric power to said motor in response to said control means.

20. The system of claim 19 wherein said stored reference pattern is produced by a test scan operation.

21. The system of claim 20 further comprising switch means disposed in a path of said scanning means for producing a signal during said test scan operation for providing a signal to said determining means indicating the intermediate position so that a reference pattern of speed and position of movement of said scanning means between said switch means and said home position is stored in said memory means, and under an ordinary scan operation, for providing said comparison means a signal that starts the comparison of present speed and position of said scanning with the stored speed and reference pattern.

22. The system of claim 21 wherein said memory means is a volatile memory, and said test scan operation is carried out at least each time a main power switch is turned on.

23. A system as claimed in claim 11, wherein said control means controls the scanning means to scan at a constant speed in a such manner that the first and second time intervals detected by said first and second period detecting means are both compared with a standard time period corresponding to the constant speed of the scanning means which is stored in the control means and each compared result corrects the application of power to said D.C. motor.

24. In an electrophotographic copier, the improvement of an apparatus for controlling the reciprocation of a scanning member to scan for reproduction from an original document in coordination with relative movement of an image carrier such as a drum comprising:

scanning means for scanning an original, said scanning means adapted to scan from a home position to a position relative to the original and the image carrier to move at a constant velocity until it reaches a fully scanned position and to return from the fully scanned position back through an intermediate position to the home position at substantially varying velocity rates;

drive means for driving and braking said scanning means;

speed detecting means for detecting the speed of said scanning means;

position detecting means for detecting the position of said scanning means at either said fully scanned position, said intermediate position or said home position;

means for providing an external power source to the copier;

means for initiating a test scan operation of the scanning means after each initiation of said external power source to provide a reference pattern of speed and position of said scanning means;

volatile memory means for storing the reference pattern of speed and position;

control means for controlling said drive means such that said scanning means scans across said original, and when it reaches said fully scanned position said scanning means is accelerated back towards said home position, and when said scanning means is returned back to said intermediate position as determined by said position detecting means, said scanning means is braked until it is stopped at said home position, including comparison means for comparing the actual speed and position of said scanning means as obtained by said speed detecting means and said position detecting means with the stored speed and position of the reference pattern from the volatile memory means and providing said control means with a signal indicating that said scanning means is at said intermediate position in response to the comparison, to determine the position to decelerate the scanning means.

25. The system of claim 24 wherein said drive means includes a D.C. motor and a switching circuit means for providing electric power to said motor in response to said control means.

26. The system of claim 25 further comprising switch means disposed in a path of said scanning means for producing a signal during said test scan operation for providing a signal to said control means indicating the intermediate position so that a reference pattern of speed and position of movement of said scanning means between said switch means and said home position is stored in said volatile memory means, and under an ordinary scan operation, for providing said comparison means a signal that starts the comparison of present speed and position of said scanning with the stored speed and reference pattern.

27. The system of claim 26 further including an encoder capable of producing pulses coordinate with the movement of said D.C. motor and means for calculating a time for turning said D.C. motor on by way of pulse width modulation so that the speed of said D.C. motor can be adjusted.

28. The system of claim 26 wherein the control means includes a microcomputer and means are provided to distinguish between a test scan operation and a reproduction ordinary scan operation.

29. The system of claim 28 wherein said drive means can apply a braking force to said scanning means by application of regeneration current from said D.C. motor and also driving current fed in the opposite direction in an alternative applications to said D.C. motor.

* * * * *

UNITED STATES PATENT OFFICE
CERTIFICATE OF CORRECTION

Patent No. 4,568,171                 Dated 2/4/86

Inventor(s) Yoshikazu Ikenoue

It is certified that error appears in the above-identified patent and that said Letters Patent are hereby corrected as shown below:

Col. 26, line 57, after "duty" insert --cycle--.

Signed and Sealed this

Twelfth Day of April, 1988

Attest:

DONALD J. QUIGG

Attesting Officer          Commissioner of Patents and Trademarks